United States Patent
Hamada et al.

(10) Patent No.: US 9,448,503 B2
(45) Date of Patent: Sep. 20, 2016

(54) IMAGE FORMING APPARATUS

(71) Applicant: Konica Minolta, Inc., Tokyo (JP)

(72) Inventors: Takatoshi Hamada, Hino (JP); Yuhei Kurigata, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/985,179

(22) Filed: Dec. 30, 2015

(65) Prior Publication Data

US 2016/0195831 A1 Jul. 7, 2016

(30) Foreign Application Priority Data

Jan. 7, 2015 (JP) .................... 2015-001867

(51) Int. Cl.
*G03G 15/00* (2006.01)
*G03G 15/041* (2006.01)
*H04N 1/387* (2006.01)
*H04N 1/04* (2006.01)

(52) U.S. Cl.
CPC ............ *G03G 15/0415* (2013.01); *H04N 1/04* (2013.01); *H04N 1/3878* (2013.01)

(58) Field of Classification Search
CPC ... G03G 15/0415; H04N 1/3878; H04N 1/04
USPC ........................................... 399/4, 51
See application file for complete search history.

(56) References Cited

U.S. PATENT DOCUMENTS 6,876,371 B2 * 4/2005 Suzuki ............... G03G 5/0578
347/118
7,671,882 B2 * 3/2010 Ozasa ............... H04N 1/40037
347/237

FOREIGN PATENT DOCUMENTS

JP 2007-109929 4/2007
JP 2009-034991 2/2009

* cited by examiner

*Primary Examiner* — Hoang Ngo
(74) *Attorney, Agent, or Firm* — Squire Patton Boggs (US) LLP

(57) ABSTRACT

Disclosed is an image forming apparatus, including: n laser elements arranged in the sub-scanning direction and configured to simultaneously scan an image; a pixel selection unit configured to execute a thinning process in which the pixels are thinned by selecting m pixels among n pixels arranged in the sub-scanning direction, and to output selected pixel information for specifying the selected pixels; a pulse width modulation processing unit configured to sequentially convert image data corresponding to the m pixels into m pulse width modulation signals; a transmission unit configured to transmit the m pulse width modulation signals in parallel; an assignment unit configured to assign the m pulse width modulation signals to m laser elements in accordance with the selected pixel information; and a driving unit configured to drive the laser elements in accordance with the assigned pulse width modulation signals.

5 Claims, 22 Drawing Sheets

RESOLTION IN SUB-SCANNING DIRECTION: 1200 dpi

RESOLTION IN SUB-SCANNING DIRECTION: 2400 dpi

IMAGE FORMING APPARATUS

BACKGROUND OF THE INVENTION

1. Field of the Invention

The present invention relates to an image forming apparatus for forming a two-dimensional image in which the pixels are arranged in the main scanning direction and the sub-scanning direction which is perpendicular to the main scanning direction. In particular, the present invention relates to an image forming apparatus which comprises a plurality of laser elements arranged in the sub-scanning direction and which can form an image simultaneously on a plurality of lines in the main scanning direction by simultaneously scanning the image in the main scanning direction with a plurality of laser lights emitted from a plurality of laser elements.

2. Description of Related Art

In an image forming apparatus using an electrophotographic process, in order to obtain a high resolution image and to realize the high speed processing, there is an image forming apparatus for forming an image simultaneously on a plurality of lines by simultaneously scanning an image by using a plurality of laser lights.

In such an image forming apparatus, for example, there is an image forming apparatus which changes the resolution in the sub-scanning direction of the image to be formed by selectively using a plurality of laser lights, and which can adjust the size in the sub-scanning direction of the image (See Japanese Patent Application Publication No. 2009-34991). The above image forming apparatus comprises a laser light source which comprises a plurality of laser elements and which can scan an image in parallel with a plurality of lines in the sub-scanning direction at the second resolution which is higher than the first resolution of the image formed in the main scanning direction. The magnification of the image in the sub-scanning direction is set according to the first resolution, the second resolution and the image size of the image to be formed, and some of a plurality of laser elements are selected and used according to the set magnification.

Further, in case that the integration degree of the surface emitting laser element (VCSEL) in the two-dimensional surface emitting laser array (two-dimensional VCSEL array) is increased, the thermal interference is caused between the adjacent laser elements (VCSEL). In order to suppress the thermal interference, after as the first main scanning in the direction perpendicular to the first base line, the VCSELs provided on the first base line and the second base line are emitted so as not to simultaneously emit the adjacent VCSELs on the first base line and so as not to simultaneously emit the adjacent VCSELs on the second base line, as the second main scanning in the direction perpendicular to the first base line, the VCSELs provided on the first base line and the second base line are emitted among the VCSELs which are not emitted in the first main scanning, so as not to simultaneously emit the adjacent VCSELs on the first base line and so as not to simultaneously emit the adjacent VCSELs on the second base line.

In an image forming apparatus using the laser elements, an LD control unit comprising laser elements and the drive circuit thereof is arranged near the laser scanning unit (or so as to be integrated with the laser scanning unit) in view of the scanning optional system for the laser light and the other mechanical request. On the other hand, an image processing unit for correcting the inclination of the image or executing the fine variable magnification for the image by processing the image data is provided apart from the LD control unit because the space is limited in the apparatus. The image processing unit transmits a signal for controlling the turning on/off of the laser elements (laser diode: LDs) provided in the LD control unit to the LD control unit in synchronization with the scanning for forming an image by using the laser lights. The above signal is a pulse width modulation signal corresponding to the value of the image data in each pixel. Therefore, the transmission path for the above signal must be high quality in order to transmit the signal at a low noise, and becomes expensive.

In case of the image forming apparatus for simultaneously forming an image on a plurality of lines by scanning the image using a plurality of laser lights emitted from a plurality of laser elements, as shown in FIG. 22, the PWM modulation circuits 121 are required for the number of the laser elements in the image processing unit 120. Further, in order to transmit the pulse width modulation signals generated by the image processing unit 120 to the LD control unit 110 at a low noise, the transmission paths having the high quality are required for the number of the laser elements. In case that the number of the laser elements is increased (for example, 32, 64 or more, or the like), the required number of the PWM modulation circuits and the required number of the transmission paths are increased. Therefore, the cost of the apparatus is increased and it is difficult to secure the space for arranging the transmission paths.

Each of Japanese Patent Application Publication No. 2009-34991 and Japanese Patent Application Publication No. 2007-109929 relates to the technology for selectively driving a plurality of emitting elements. However, the technology for reducing the number of the PWM modulation circuits or the number of the transmission paths for the pulse width modulation signals is not disclosed. Further, in each of the above technologies, in case that some of a plurality of emitting elements are selectively used, the deterioration of the resolution and/or the deterioration of the productivity are caused.

SUMMARY

To achieve at least one of the abovementioned objects, an image forming apparatus for forming a two-dimensional image in which pixels are arranged in a main scanning direction and a sub-scanning direction which is perpendicular to the main scanning direction, reflecting one aspect of the present invention, comprises:

n laser elements arranged in the sub-scanning direction and configured to simultaneously scan an image in the main scanning direction by using laser lights emitted from the n laser elements to simultaneously form the image having n lines in the main scanning direction, n being an integer which is 2 or more;

a pixel selection unit configured to execute a thinning process in which the pixels are thinned to m/n by selecting m pixels among n pixels arranged in the sub-scanning direction, m being an integer which is 1 or more and is less than n, and the thinning process being executed for the image having the n lines, and to output selected pixel information for specifying the selected pixels;

a pulse width modulation processing unit configured to sequentially convert image data corresponding to the m pixels selected by the pixel selection unit into m pulse width modulation signals for the m pixels in synchronization with the scan of the image when the image having the n lines is formed;

a transmission unit configured to transmit the m pulse width modulation signals output by the pulse width modulation processing unit in parallel;

an assignment unit configured to assign the m pulse width modulation signals transmitted by the transmission unit in parallel to m of the laser elements in accordance with the selected pixel information; and a driving unit configured to drive the laser elements to which the pulse width modulation signals are assigned by the assignment unit, in accordance with the assigned pulse width modulation signals.

Preferably, an equation m×q=n is satisfied, where q is an integer which is 2 or more, and the pixel selection unit divides the n pixels arranged in the sub-scanning direction into m small areas in each of which q adjacent pixels are included, selects one pixel from each small area, and outputs information for specifying the pixel selected from each small area as the selected pixel information.

Preferably, the image forming apparatus further comprises:

a compression unit configured to compress the selected pixel information; and a decompression unit configured to decompress compressed data output from the compression unit, to the selected pixel information, wherein the assignment unit assigns the m pulse width modulation signals in accordance with the selected pixel information obtained by decompressing the compressed data in the decompression unit.

Preferably, the image forming apparatus further comprises:

an image correction unit configured to execute a fine variable magnification or a skew correction for the image by shifting the pixels, wherein the pixel selection unit selects the m pixels according to a shift amount caused in the image correction unit.

Preferably, the image forming apparatus further comprises:

an image correction unit configured to execute a fine variable magnification or a skew correction for the image by shifting the pixels, wherein the pixel selection unit selects the m pixels according to a shift amount caused by shifting the pixels in the image correction unit, and the compression unit compresses the selected pixel information in a situation in which number of times of change in the shift amount is limited in the n pixels arranged in the sub-scanning direction.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENTS

Hereinafter, preferred embodiments of the present invention will be explained with reference to the accompanying drawings.

First Embodiment

Figure 1:
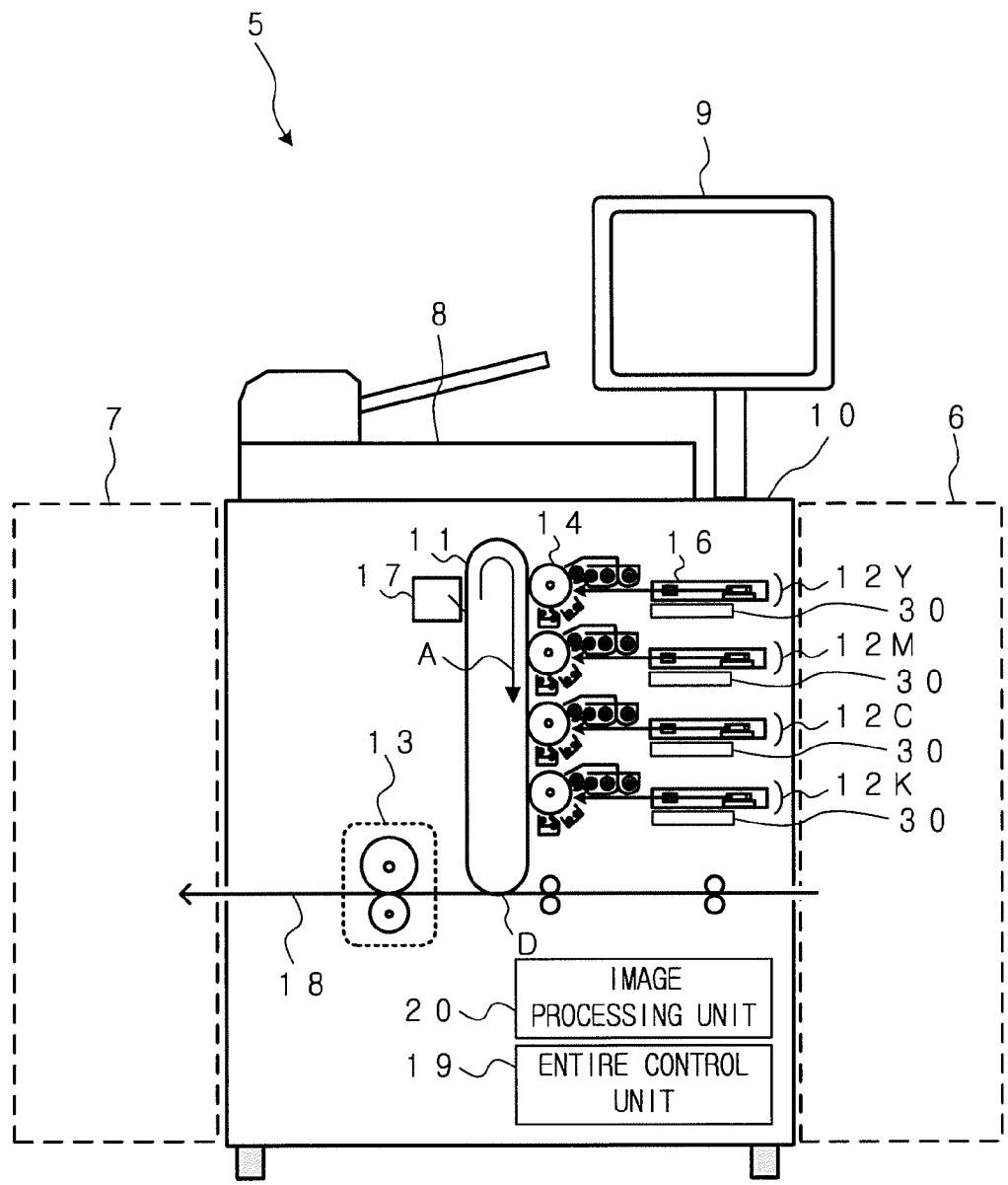
FIG. 1 is a view showing the mechanical schematic configuration of the image forming apparatus according to the first embodiment.

FIG. 1 is a view showing the mechanical schematic configuration of the image forming apparatus 5 according to the first embodiment. The image forming apparatus 5 has a copy function for printing out an image on a recording sheet by optically reading an original in a scanner unit 8, a printing function for printing out an image by forming the image on a recording sheet in accordance with the print data received from an external device, and the like. At the front stage of the image forming apparatus 5, a paper sheet feeding device 6 for containing a large number of recording sheets and for feeding the recording sheets one by one to the image forming apparatus 5 when the image or the like is printed, is connected. At the rear stage of the image forming apparatus 5, a post-processing device 7 having a function for carrying out the processing, such as folding, binding, punching and the like, for the recording sheet output from the image forming apparatus 5 and a function for containing a large number of recording sheets on which images are printed, is connected.

The image forming apparatus 5 forms a two-dimensional image in which the pixels are arranged in the main scanning direction and the sub-scanning direction which is perpendicular to the main scanning direction. The conveying direction of the recording sheet is referred to as the sub-scanning direction. The image forming apparatus 5 comprises an endless intermediate transfer belt 11 that is bridged annularly and that has a predetermined width, four toner image forming units 12Y, 12M, 12C and 12K which form single color toner images having the colors of yellow (Y), magenta (M), cyan (C) and black (K), respectively on the intermediate transfer belt 11, and a fixing device 13 for fixing the toner images on the recording sheet by pressing and heating the toner images formed on the recording sheet.

The toner image forming units 12Y, 12M, 12C and 12K use toners of different colors, but have the same structure. Each of the toner image forming units 12Y, 12M, 12C and 12K comprises a cylindrical photoconductive drum 14 that functions as an electrostatic latent image carrier on which an electrostatic latent image is formed, and comprises a charging device, a developing device, a transferring device, a cleaning device, and the like that are arranged around the photoconductive drum 14. Further, each of the toner image forming units 12Y, 12M, 12C and 12K has a laser unit 16 that includes laser diodes (LDs) which are the laser elements, a polygon mirror, various types of lenses and mirrors, and the like.

In each of the toner image forming units 12Y, 12M, 12C and 12K, the photoconductive drum 14 is driven by a driving unit not illustrated in the drawings to be rotated in a predetermined direction. The charging device uniformly charges the photoconductive drum 14. The laser unit 16 scans the photoconductive drum 14 (in the main scanning direction) with laser beams that are turned on and off in accordance with image data of the corresponding color (the pulse width modulation signal which will be explained) to form the electrostatic latent image on the surface of the photoconductive drum 14. In this embodiment, each laser unit 16 comprises n (n is an integer which is 2 or more) laser diodes (LDs) which are arranged in the sub-scanning direction. By simultaneously scanning an image in the main scanning direction by using the laser lights emitted from the n laser elements, the image can be formed simultaneously on n lines in the main scanning direction. In this embodiment, n laser diodes do not simultaneously emit laser lights, but the image of n lines is formed while the image is thinned.

The developing device visualizes the electrostatic latent image formed on the photoconductive drum 14 by using a toner. The toner image formed on the surface of the photoconductive drum 14 is transferred on the intermediate transfer belt 11 at the position where the photoconductive drum 14 contacts with the intermediate transfer belt 11. The cleaning device removes and collects the toner which remains on the surface of the photoconductive drum 14 by rubbing the remaining toner with a blade or the like after the transfer of the toner image.

The intermediate transfer belt 11 is wound so as to be bridged by a plurality of rollers, and is rotated in the direction of the arrow A in the drawing. In a process of the rotation of the intermediate transfer belt 11, the images (toner images) of the respective colors are formed on the intermediate transfer belt 11 so as to overlap the images in the order of the color Y, the color M, the color C and the color K by the image forming units 12Y, 12M, 12C and 12K. Thereby, the color image is composed. This color image is transferred from the intermediate transfer belt 11 to the recoding sheet at a second transferring position D. The toner which remains on the intermediate transfer belt 11 is removed by the cleaning device 17 provided on the downstream side of the second transferring position D. The fixing device 13 is provided on the position which is on the downstream side of the second transferring position D on a conveying passage 18 for conveying the recording sheet.

The conveying passage 18 has a function of conveying the recording sheet fed from the paper sheet feeding device 6 so as to pass the recording sheet through the second transferring position D and the fixing device 13, and discharging the recording sheet to the post-processing device 7 which is arranged on the rear stage. The conveying passage 18 is configured by conveying rollers and a guide unit that form a conveying path, and by a motor that drives the conveying rollers.

The image forming apparatus 5 comprises an entire control unit 19 for controlling the entire operation of the image forming apparatus 5 as an electric control circuit, an image processing unit 20 for carrying out the inclination correction (skew correction), the fine variable magnification, the dither screen processing or the like for the image to be formed, and LD control units 30 for driving the laser diodes (LDs) of the laser units 16. Each LD control unit 30 is provided with each laser unit 16, and is arranged near the corresponding laser unit 16 (or is integrated with the laser unit 16). Therefore, each LD control unit 30 is provided apart from the entire control unit 19 and the image processing unit 20. The image processing unit 20 is connected with each LD control unit 30 via the transmission paths for transmitting the signal.

The image forming apparatus 5 has the two-side printing function for printing images on both sides of the recording sheet although the above two-side printing function is omitted from FIG. 1. Specifically, the conveying passage 18 comprises the reversing path which diverges from the normal conveying passage 18 on the downstream side of the fixing device 13 and which converges with the conveying passage 18 on the upstream side of the second transferring position D after the recording sheet is reversed. In case that the two-side printing is carried out, the image forming apparatus 5 forms and fixes the image on the front side of the recording sheet, and reverses the recording sheet through the reversing path. Then, the image forming apparatus 5 forms and fixes the image on the rear side of the recording sheet and discharges the recording sheet to the rear stage.

In addition, the image forming apparatus 5 further comprises a scanner unit 8 for reading an original set on an original tray by a user, an operation panel 9 for receiving the operation from a user and displaying various types of windows, and the like.

Figure 2:
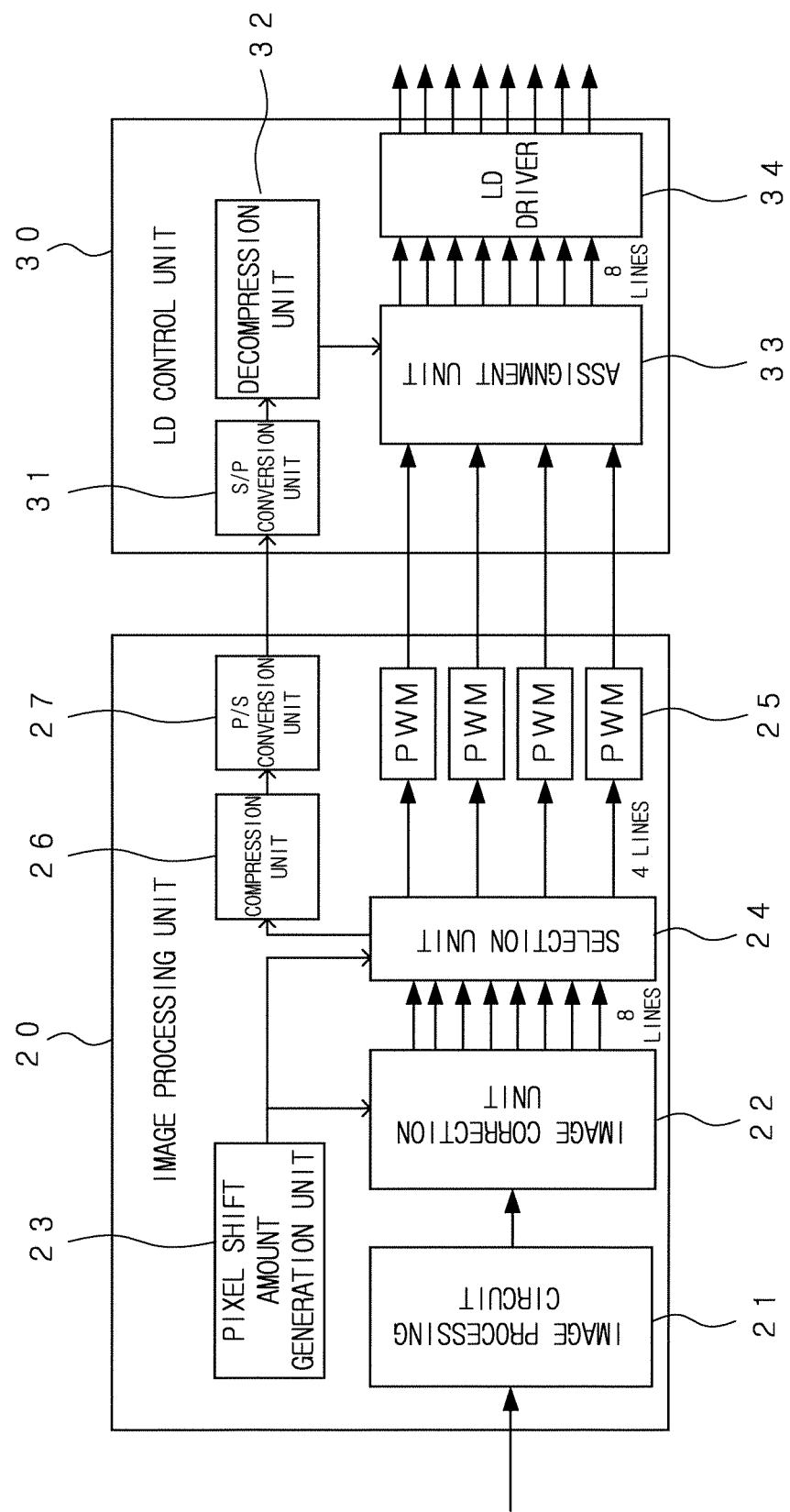
FIG. 2 is a block diagram showing each configuration of the image processing unit and the LD control unit.

FIG. 2 shows the configuration of the image processing unit 20 and the LD control unit 30. The image processing unit 20 comprises an image processing circuit 21 for processing the image data of the image to be formed and for carrying out the dither screen processing or the like for the image, an image correction unit 22 for carrying out the skew correction or the fine variable magnification for the image processed by the image processing unit 21 by shifting pixels, a pixel shift amount generation unit 23 for calculating and outputting the required shift amount of each pixel when the skew operation or the fine variable magnification is carried out, a selection unit 24 for selecting some pixels from the image data output from the image correction unit 22 to execute the thinning process, and for outputting the selected pixel information for specifying the selected pixels and PWM processing units 25 for converting the image data of each pixel selected by the selection unit 24 into a pulse width modulation signal, a compression unit 26 for compressing the selected pixel information output from the selection unit 24 and for outputting the compressed data, and a P/S conversion unit 27 for converting the compressed data from the parallel signal to the serial signal.

The pixel shift amount generation unit 23 outputs the shift amount signal indicating the shift amount. The shift amount signal is input to the image correction unit 22 and the selection unit 24. The image correction unit 22 shifts the position of each pixel in the sub-scanning direction in accordance with the shift amount indicated in the shift amount signal input from the pixel shift amount generation unit 23.

The image correction unit 22 outputs the image data having n lines to be simultaneously scanned by the laser unit 16 in parallel (the image data of n lines adjacent in the sub-scanning direction in parallel). At this time, the image data of each line is output sequentially from the head pixel to the end pixel of the line in synchronization with the scanning executed by the laser unit 16.

The selection unit 24 executes the process for thinning the image to m/n by selecting m (m is an integer which is 1 or more and is less than n) pixels from n pixels of the image data input from the image correction unit 22 in parallel while the positions of the pixels to be selected are changed according to the shift amount indicated in the shift amount signal input from the pixel shift amount generation unit 23. The selection unit 24 simultaneously outputs the thinned image data of m pixels in parallel to the PWM processing units 25 which are arranged on the rear stage of the selection unit 24. Further, the selection unit 24 generates the selected pixel information indicating the positions of m pixels selected from n pixels input from the image correction unit 22 in parallel, and outputs the selected pixel information to the compression unit 26. In the first embodiment, the value n is 8 and the value m is 4.

The PWM processing unit 25 converts the image data input from the selection unit 24 into the pulse width modulation signal. The image data represents the density of the pixel at the multistage. The PWM processing unit 25 outputs the pulse width modulation signal having the pulse width corresponding to the density represented by the input image data. In the image processing unit 20, m PWM processing units 25 are provided so as to correspond to the image data of m pixels which are simultaneously output from the selection unit 24 in parallel. Each PWM processing unit 25 processes one corresponding pixel of the m selected pixels. The PWM processing unit 25 has an output driver for transmitting the pulse width modulation signal to the LD control unit 30 via the transmission path, and the like. The transmission unit for transmitting the pulse width modulation signal is configured by the output driver, the transmission path arranged between the PWM processing unit 25 and the assignment unit 33 of the LD control unit 30, and the like. The pixel transmitted by the pulse width modulation signal from the image processing unit 20 to the LD control unit 30 is referred to as the dotted pixel, and the pixel which is not transmitted is referred to as the non-dotted pixel.

In the example of FIG. 2, four pixels are selected as the dotted pixels from eight pixels arranged in the sub-scanning direction, which correspond to 8 laser diodes (LD1 to LD8: LD array) of the laser unit 16. The image data of the selected four pixels are converted into the pulse width modulation signals to transmit the signals from the image processing unit 20 to the LD control unit 30. Further, the selected pixel information indicating each position of four selected pixels in eight pixels arranged in the sub-scanning direction is transmitted to the LD control unit 30 as a serial digital signal.

The LD control unit 30 comprises an S/P conversion unit 31 for converting the serial digital signal transmitted from the image processing unit 20 into the parallel signal, a decompression unit 32 for decompressing the data (compressed data) output from the S/P conversion unit 31 to the original selected pixel information, an assignment unit 33 for assigning four pulse width modulation signals transmitted from the image processing unit 20 in parallel to the laser diodes corresponding to the positions of the pixels (the positions of the pixels in eight pixels arranged in the sub-scanning direction), which are indicated in the selected pixel information output from the decompression unit 32, and an LD driver 34 for driving the laser diodes in accordance with the pulse width modulation signals assigned by the assignment unit 33.

The LD driver 34 is provided for each laser diode. The LD driver 34 to which the pulse width modulation signal is assigned by the assignment unit 33 drives the corresponding laser diode in accordance with the pulse width modulation signal. The LD driver 34 to which the pulse width modulation signal is not assigned turns off the corresponding laser diode.

Next, the operation of the image processing unit 20 and the LD control unit 30 will be explained.

Figure 3:
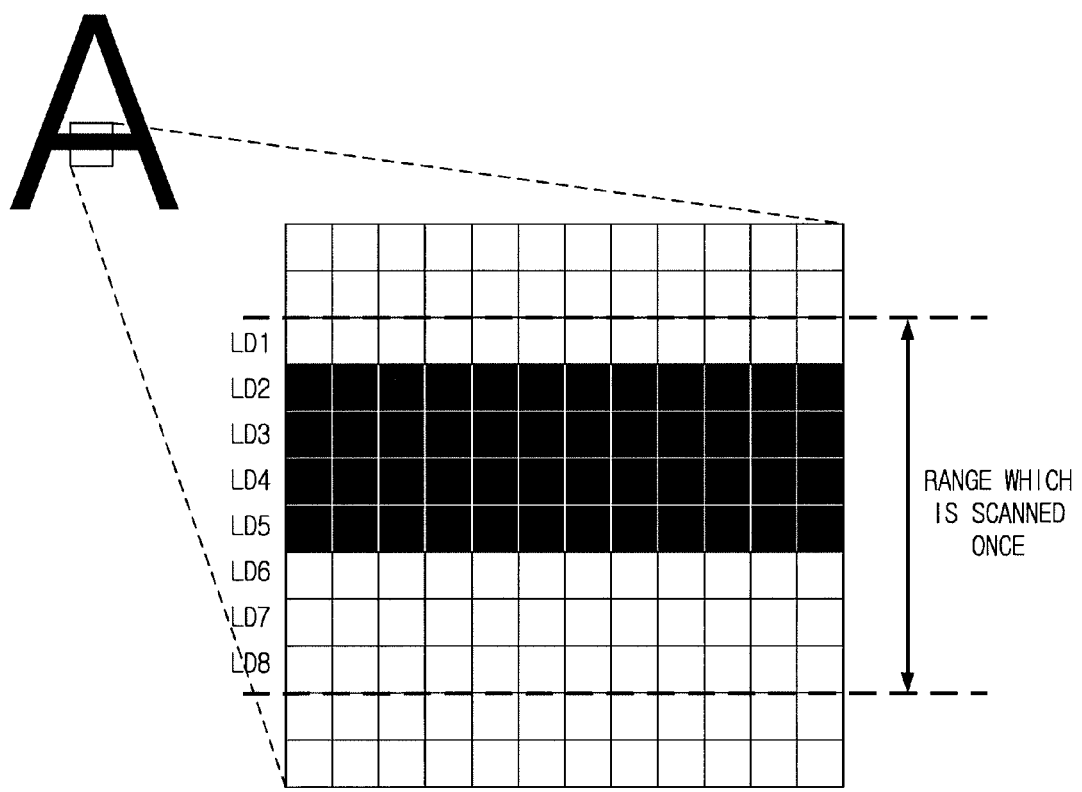
FIG. 3 is a view showing an example of an original image and the range in which the image is formed by one scanning.

FIG. 3 shows an example of the image which is written by one scanning. The image shown in FIG. 3 is an image which has not been corrected by the image correction unit 22. The image is a horizontal line (a line in the main scanning direction) having the width of 4 dots in the sub-scanning direction.

Figure 4:
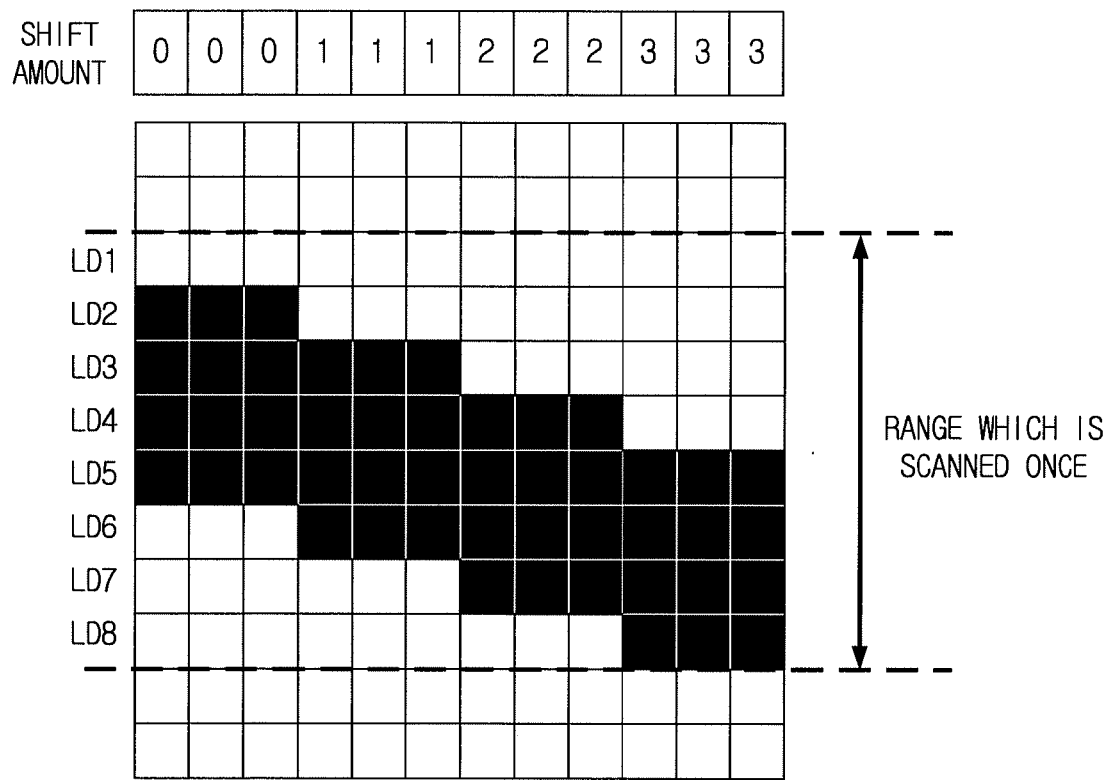
FIG. 4 is a view showing the image obtained by carrying out the skew correction for the image shown in FIG. 3 in the image correction unit.

FIG. 4 shows an image obtained by carrying out the skew correction for the image shown in FIG. 3 in the image correction unit 22. In this example, the shift amount in the sub-scanning direction is increased by 1 every three pixels in the main scanning direction. That is, each of the pixels having the positions in the main scanning direction of 1 to 3, respectively, has the shift amount in the sub-scanning direction of 0. Each of the pixels having the positions in the main scanning direction of 4 to 6, respectively, has the shift amount in the sub-scanning direction of 1. Each of the pixels having the positions in the main scanning direction of 7 to 9, respectively, has the shift amount in the sub-scanning direction of 2. Each of the pixels having the positions in the main scanning direction of 10 to 12, respectively, has the shift amount in the sub-scanning direction of 3.

Figure 5:
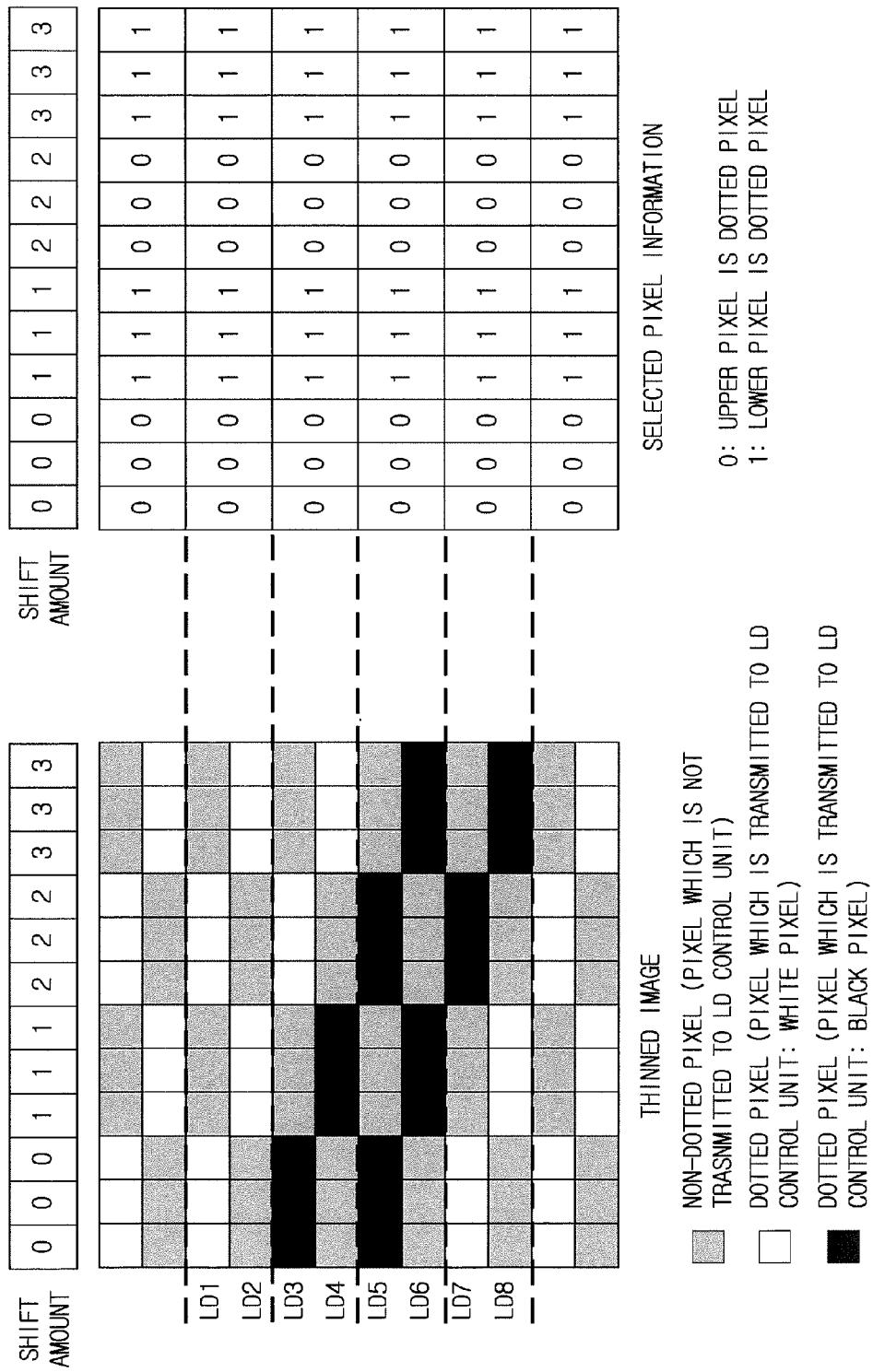
FIG. 5 is a view showing the image obtained by thinning the image shown in FIG. 4, and the position of the dotted pixel and the selected pixel information according to the shift amount.

FIG. 5 shows the thinned image obtained by thinning the image shown in FIG. 4 to ½ (4 pixels/8 pixels) in the selection unit 24, and the selected pixel information output for this image. In this case, the selection unit 24 divides n pixels arranged in the sub-scanning direction into m of the small areas. Each small area includes q adjacent pixels. One pixel is selected from each small area and the information indicating the pixel selected in the small area is output as the selected pixel information. The equation n=q×m is satisfied.

In an example of FIG. 5, eight pixels are divided into the small areas formed by arranging 1 pixel in the main scanning direction and 2 pixels in the sub-scanning direction. In each small area, one pixel is selected as the dotted pixel. The selected pixel information having 1 bit is assigned to each small area. The selected pixel information having 1 bit indicates that the upper pixel (the head pixel side in the sub-scanning direction) of the small area is selected as the dotted pixel when the value thereof is "0", and indicates that the lower pixel of the small area is selected as the dotted pixel when the value thereof is "1".

In the example of FIG. 5, in case that the shift amount is an even number, such as 0, 2 or the like, the upper pixel of the small area is selected as the dotted pixel. In case that the shift amount is an odd number, such as 1, 3 or the like, the lower pixel of the small area is selected as the dotted pixel.

Figure 6:
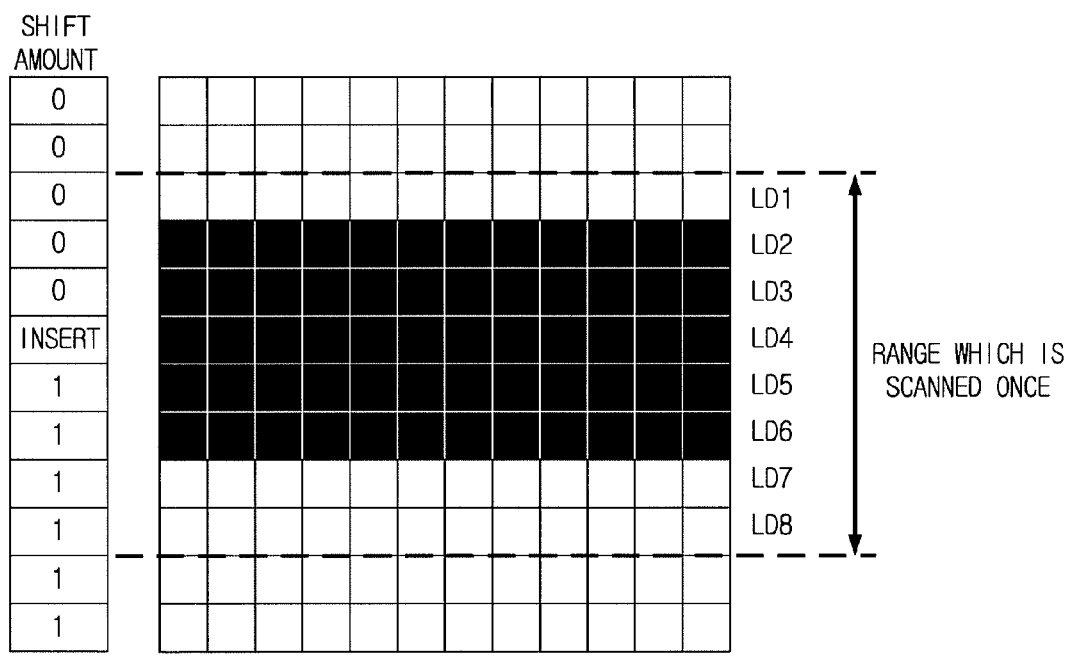
FIG. 6 is a view showing an image obtained by carrying out the fine variable magnification for the image shown in FIG. 3 and then by inserting one line.

FIG. 6 shows an image obtained by carrying out the fine variable magnification for the image shown in FIG. 3. In this example, one line in the main scanning direction is inserted in the range which is scanned at a time. Specifically, one line is inserted at the position on which the image is drawn by using LD4. Therefore, in the range which is upper than the insert position of one line, the shift amount is 0. In the range which is lower than the insert position of one line, the shift amount is 1.

Figure 7:
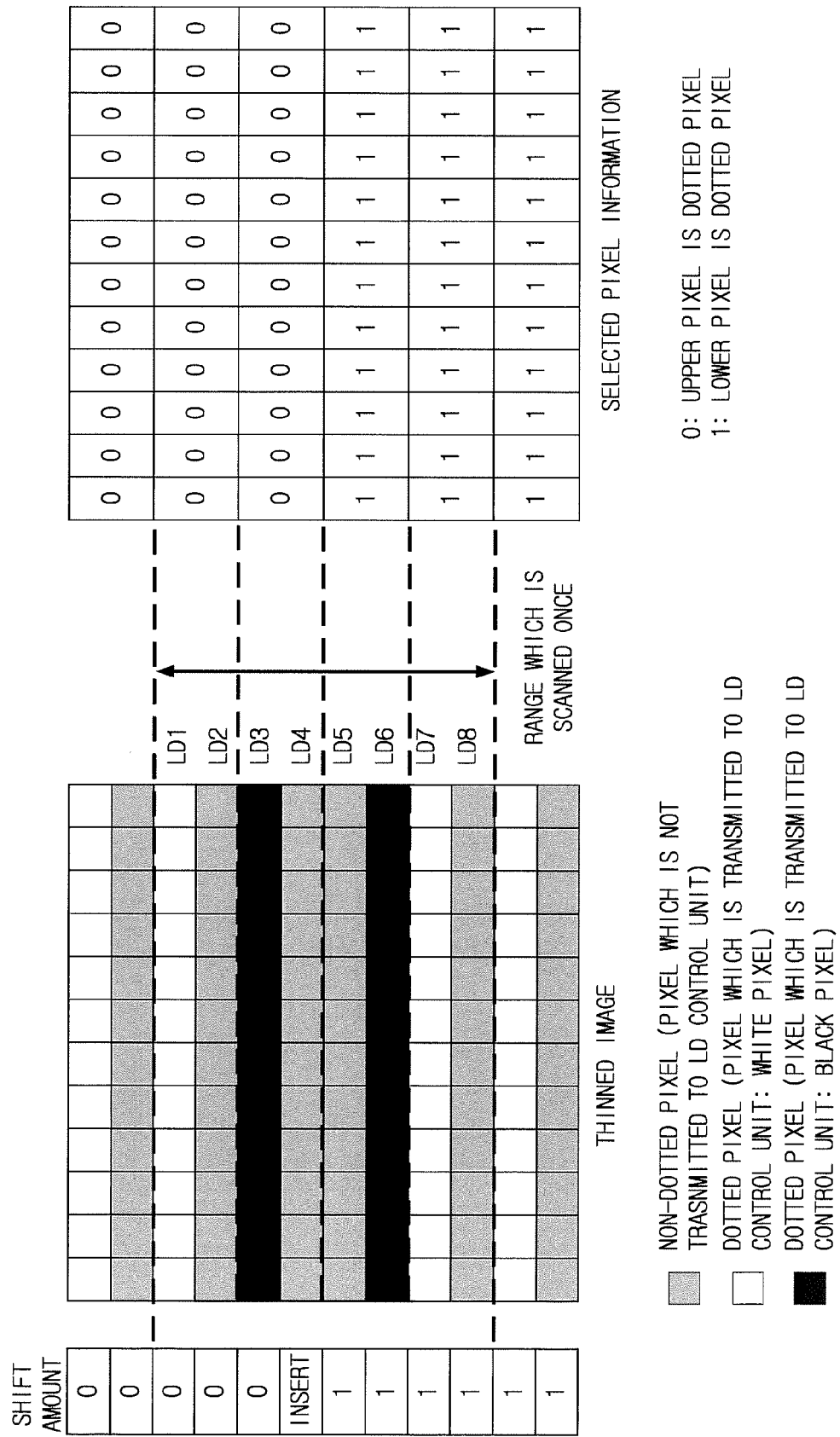
FIG. 7 is a view showing an image obtained by thinning the image shown in FIG. 6, and the position of the dotted pixel and the selected pixel information according to the shift amount.

FIG. 7 shows the thinned image obtained by thinning the image shown in FIG. 6 to ½ (4 pixels/8 pixels) in the selection unit 24, and the selected pixel information which is output for the above image. Like the case of FIG. 5, the selection unit 24 divides n pixels into small areas formed by arranging 1 pixel in the main scanning direction and 2 pixels in the sub-scanning direction. In each small area, one pixel is selected as the dotted pixel. The selected pixel information having 1 bit is assigned to each small area. The selected pixel information having 1 bit indicates that the upper pixel of the small area is selected as the dotted pixel when the value thereof is "0", and indicates that the lower pixel of the small area is selected as the dotted pixel when the value thereof is "1".

In the example of FIG. 7, in the small area in which the shift amount is 0, the upper pixel is selected as the dotted pixel. In the small area in which the shift amount is 1, the lower pixel is selected as the dotted pixel. Every when one line is inserted, the shift amount is increased by 1 and the position of the dotted pixel is changed. That is, in case that the shift amount is an even number, such as 0, 2, 4 or the like, the upper pixel is selected as the dotted pixel. In case that the shift amount is an odd number, such as 1, 3, 5 or the like, the lower pixel is selected as the dotted pixel.

As described above, four pixels are selected from eight pixels arranged in the sub-scanning direction in eight lines which is scanned by the laser unit 16 at a time, and the pulse width modulation signals for only the selected four pixels are transmitted from the image processing unit 20 to the LD control unit 30. Therefore, it is possible to reduce the number of the PWM processing units 25 and the number of the transmission paths for transmitting the pulse width modulation signals. Further, because the selected pixel information for specifying the pixel selected as the dotted pixel by the selection unit 24 is transmitted from the image processing unit 20 to the LD control unit 30, it is possible to select an optional pixel as the dotted pixel. In particular, because the dotted pixel is selected according to the shift amount, it is possible to maintain the image quality by selecting the suitable pixels as the dotted pixels.

Because eight pixels corresponding to eight laser diodes (LD1 to LD8) arranged in the sub-scanning direction are divided into four small areas (the combination of LD1 and LD2, the combination of LD3 and LD4, the combination of LD5 and LD6 and the combination of LD7 and LD8), the selected pixel information for eight pixels is expressed by 4 bits. In the fine variable magnification carried out by the image correction unit 22, the pixels are inserted (or deleted) only at the rate of once every several tens of lines at the maximum. Therefore, the change in the shift amount is limited to one time at the maximum in the above eight pixels. Also in case of the skew correction, the change in the shift amount is limited to one time at the maximum in the above eight pixels.

Figure 8:
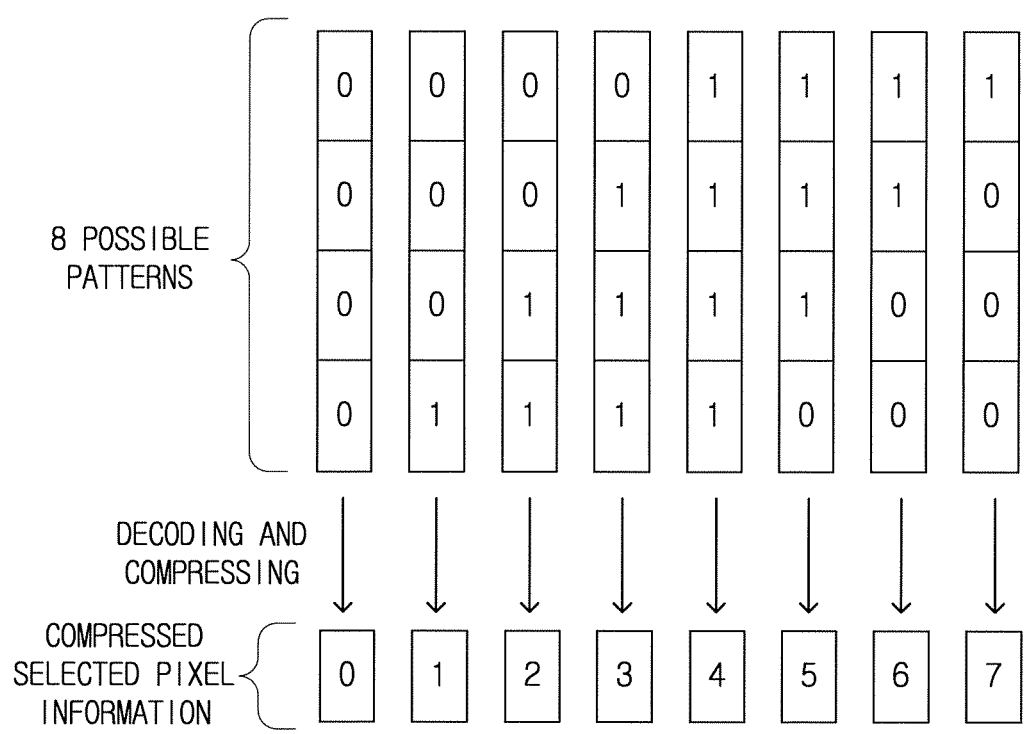
FIG. 8 is a view showing the possible combinations of the selected pixel information, and an example of the selected pixel information obtained after the compression of the image.

When the selected pixel information having 4 bits for eight pixels corresponding to eight laser diodes (LD1 to LD8) arranged in the sub-scanning direction is treated as one set of data, the possible patterns of the above data having 4 bits are limited to 8 patterns as shown in FIG. 8. Therefore, the pattern of the above data having 4 bits is compressed by encoding the pattern to 3 bits in the compression unit 26.

As described above, by compressing the selected pixel information, the size of the data transmitted as the selected pixel information from the image processing unit 20 to the LD control unit 30 can be reduced.

Next, the reason why the image quality is maintained even though the pixels to be dotted by the laser diodes are thinned, will be explained.

Figure 9:
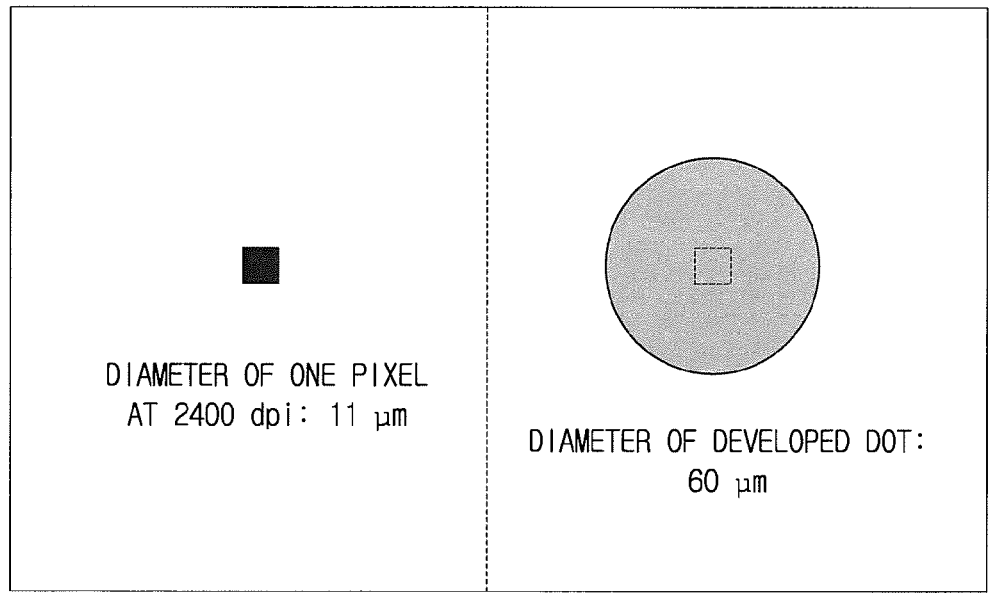
FIG. 9 is a view showing the diameter of one pixel on the electronic data at the resolution of 2400 dpi and the diameter of a dot which is actually printed.
Figure 10:
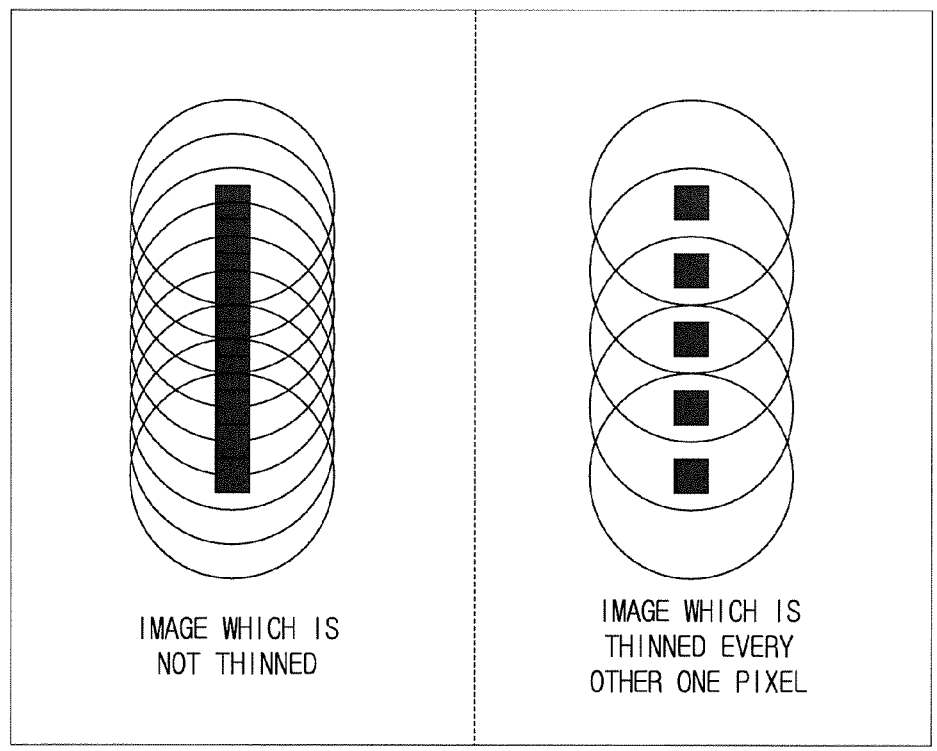
FIG. 10 is a view showing the image which is printed in case that the image is not thinned, and the image which is printed in case that the image is thinned.

In the electrophotographic process, in case that one pixel is isolatedly dotted by using the laser light, the diameter of the dot obtained by developing and printing one pixel on the recording sheet is considerably larger than the diameter of one pixel on the electronic data. For example, as shown in FIG. 9, in case of the resolution of 2400 dpi, the diameter of one pixel is 11 μm on the electronic data. On the other hand, the diameter of the dot which is actually developed is about 60 μm. As a result, the diameter of the dot which is actually developed is 5 times larger than the diameter of one pixel on the electronic data. Therefore, in case of a normal image, even though the image having the resolution of 2400 dpi is dotted by thinning the image every other one pixel as shown in FIG. 10, or by thinning the image at the interval of two pixels, the obtained image is hardly changed from the original image.

Figure 11A:
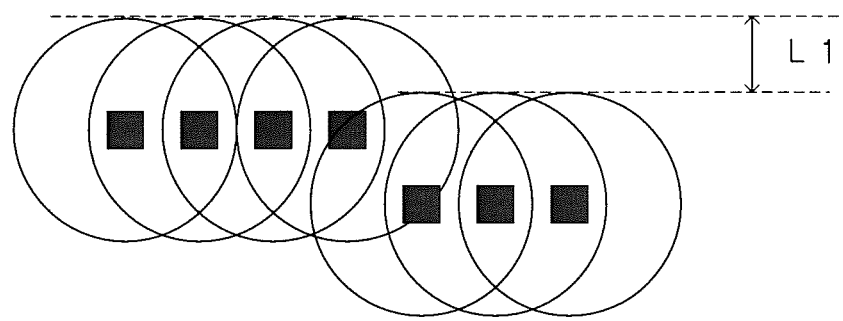
FIGS. 11A and 11B are views showing an example in which the difference in the resolution in the sub-scanning direction is shown in the printed image.
Figure 11B:
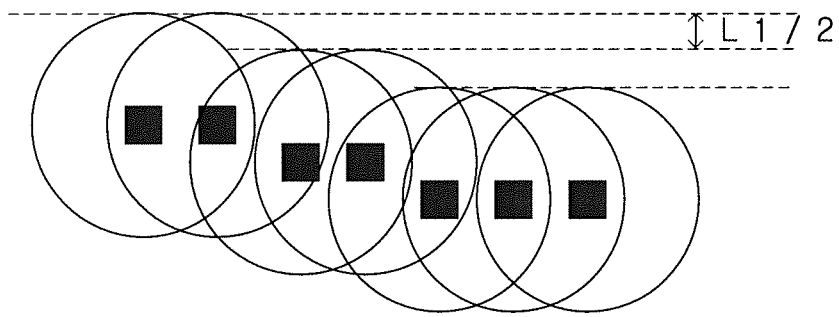

When the resolution of the image is high, the position of the pixel can be precisely controlled. FIGS. 11A and 11B show an example in which the position of the line in the main scanning direction is changed in the sub-scanning direction. The resolution of the image in the sub-scanning direction, which is shown in FIG. 11B is twice as much as that of the image shown in FIG. 11A. In case of FIG. 11A, the position of the line in the sub-scanning direction is changed only in units of the distance L1. On the other hand, in case of FIG. 11B, the position of the line can be changed in units of the distance L1/2.

Second Embodiment

In the first embodiment, the image is thinned to ½ by selecting four pixels from eight pixels arranged in the sub-scanning direction in the selection unit 24. The number n of the laser diodes and the number m of the pixels to be selected may be optionally set in case that the inequality n>m is satisfied and each of n and m is an integer which is 1 or more. For example, by setting n to 9 and m to 3, the image data may be thinned to ⅓. In the second embodiment, the case in which the image data is thinned to ⅓ by selecting three pixels from nine pixels arranged in the sub-scanning direction. The laser unit 16 comprises nine laser diodes arranged in sub-scanning direction, and can simultaneously scan nine lines in the main scanning direction.

Figure 12:
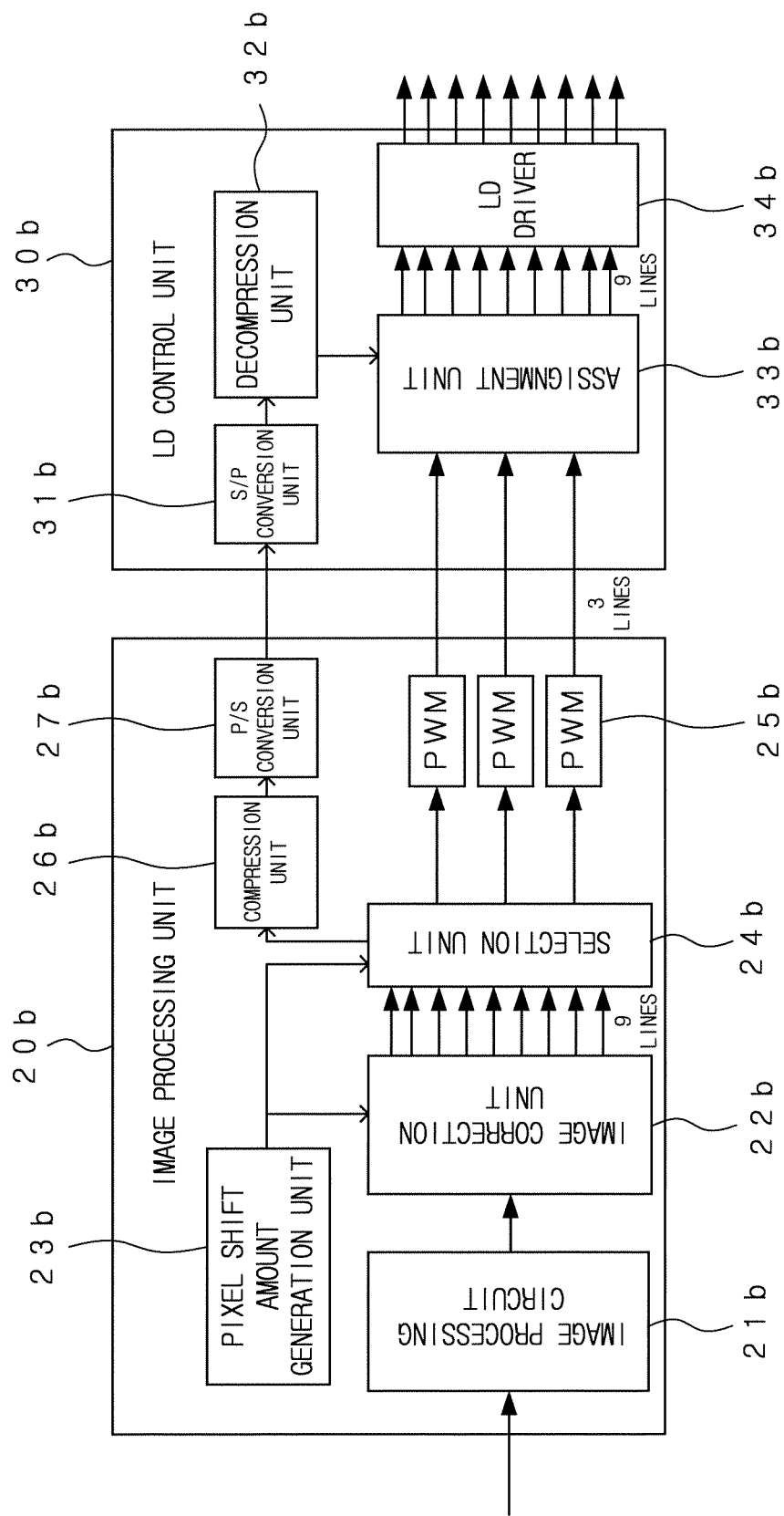
FIG. 12 is a block diagram showing each configuration of the image processing unit and the LD control unit, for thinning the image to ⅓.

FIG. 12 shows each configuration of the image processing unit 20b and the LD control unit 30b in case that the image is thinned to ⅓. Only the image data corresponding to three of nine laser diodes is transmitted to the LD control unit 30b by the pulse width modulation signals. Thereby, the number of the PWM processing units 25b and the number of the transmission paths for transmitting the pulse width modulation signals can be set to 3 which is ⅓ of the number of laser diodes. Each configuration of the image processing unit 20b and the LD control unit 30b is the same as that of FIG. 2 except that the thinning ratio is different from each other. In FIG. 12, the elements corresponding to those of FIG. 2 are denoted by the reference in which the character "b" is added to the numerals shown in FIG. 2. The explanation thereof is omitted.

For example, in case that the image which has not been corrected by the image correction unit 22 has the resolution of 800 dpi and the above image is converted into the image having the resolution of 2400 dpi by adding the position correction information in the image correction unit 22, the thinning operation for thinning the image to ⅓ is applied.

Next, the operation of the image processing unit 20b and the LD control unit 30 will be explained.

Figure 13:
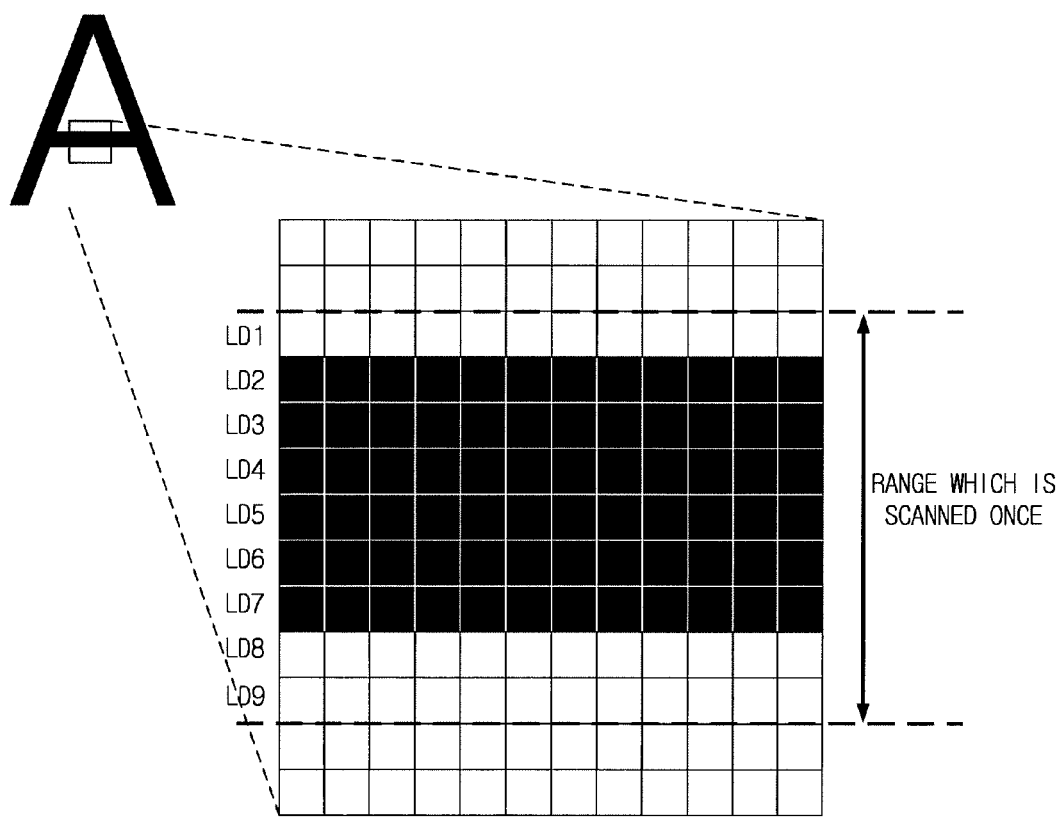
FIG. 13 is a view showing an example of an original image and the range in which the image is formed by one scanning.

FIG. 13 shows an example of the image which is written by one scanning. The image shown in FIG. 3 is an image which has not been corrected by the image correction unit 22b. In this example, the line in the main scanning direction, which has the width of 6 dots corresponding to LD2 to LD7 in the range to be scanned by the laser unit 16 at a time, is drawn.

Figure 14:
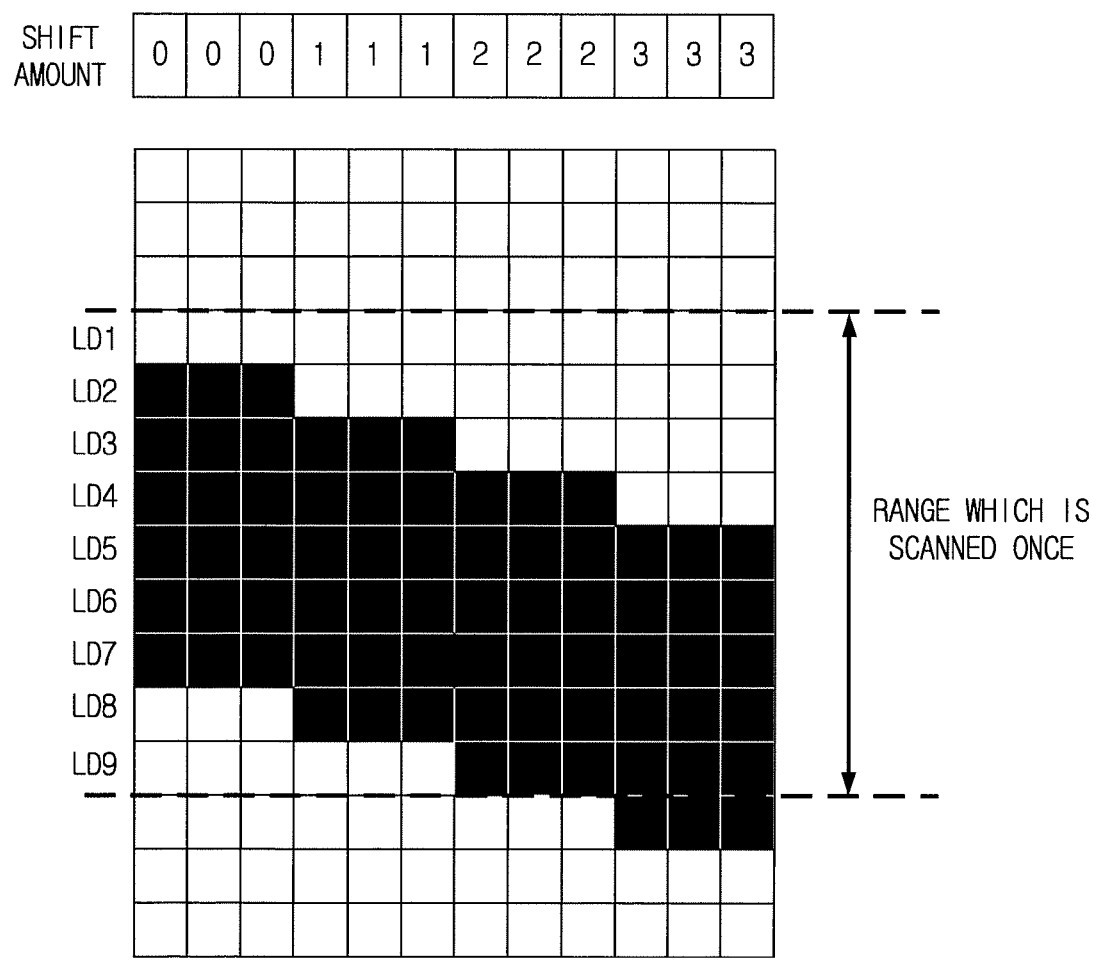
FIG. 14 is a view showing the image obtained by carrying out the skew correction for the image shown in FIG. 13 in the image correction unit.

FIG. 14 shows an image obtained by carrying out the skew correction for the image shown in FIG. 13 in the image correction unit 22b. In this example, the shift amount in the sub-scanning direction is increased by 1 every three pixels in the main scanning direction.

Figure 15:
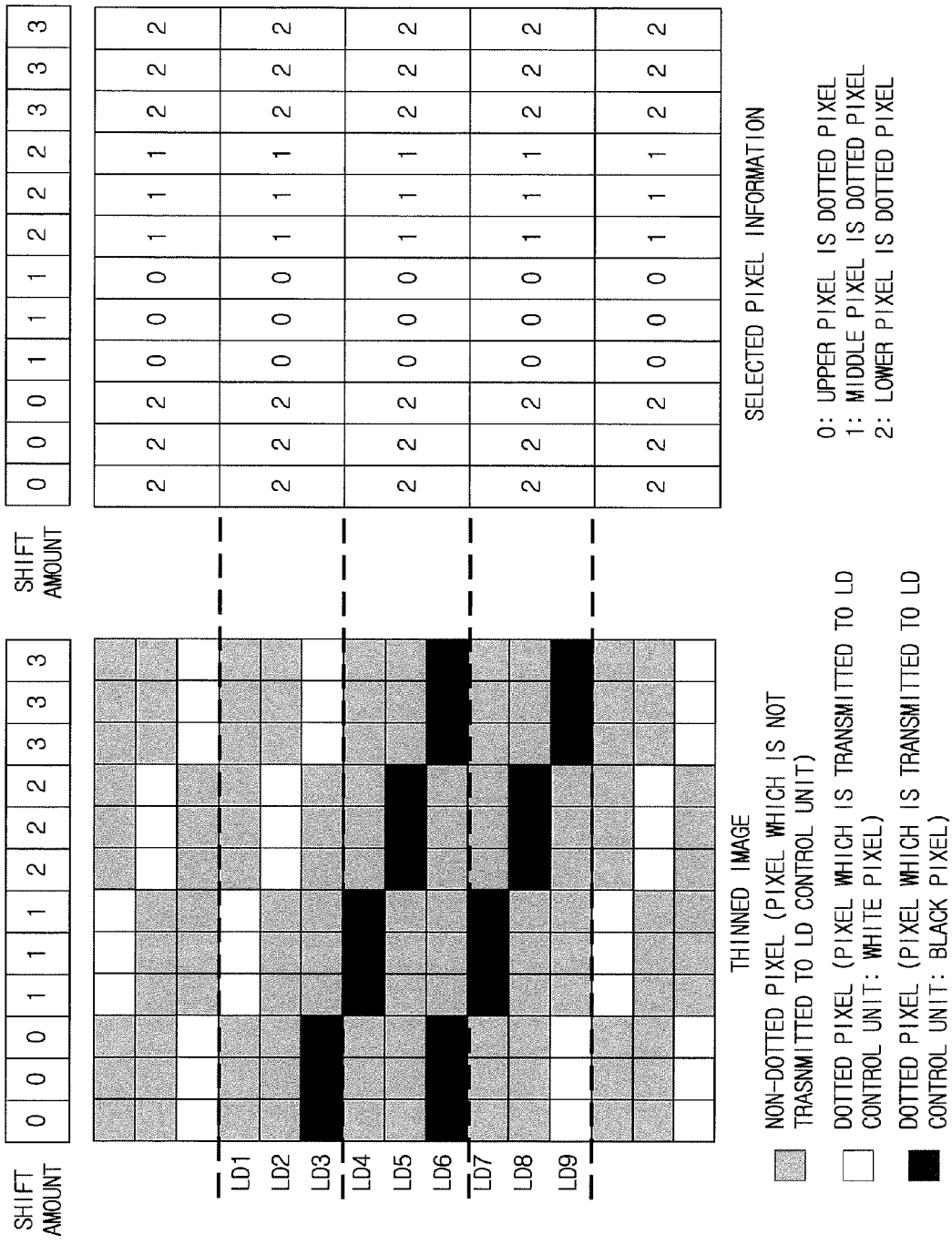
FIG. 15 is a view showing the image obtained by thinning the image shown in FIG. 14, and the position of the dotted pixel and the selected pixel information according to the shift amount.

FIG. 15 shows the thinned image obtained by thinning the image shown in FIG. 14 to ⅓ (3 pixels/9 pixels) in the selection unit 24b, and the selected pixel information output for this image. In this case, the selection unit 24b divides nine pixels arranged in the sub-scanning direction into three small areas. Each small area includes three adjacent pixels. One pixel is selected from each small area the selected pixel information indicating the pixel selected in the small area is output.

In an example of FIG. 15, the selected pixel information having 2 bits is assigned to each small area formed by arranging 1 pixel in the main scanning direction and 3 pixels in the sub-scanning direction. The selected pixel information having 2 bits indicates that the upper pixel of the small area is selected as the dotted pixel when the value thereof is "0", indicates that the middle pixel of the small area is selected as the dotted pixel when the value thereof is "1", and indicates that the lower pixel of the small area is selected as the dotted pixel when the value thereof is "2".

In the example of FIG. 15, in case that the shift amount is a multiple of 3, such as 0, 3, 6 or the like, the lower pixel of the small area is selected as the dotted pixel. In case that the shift amount is a value obtained by adding +1 to the multiple of 3, such as 1, 4, 7 or the like, the upper pixel of the small area is selected as the dotted pixel. In case that the shift amount is a value obtained by adding +2 to the multiple of 3, such as 2, 5, 8 or the like, the middle pixel of the small area is selected as the dotted pixel.

Figure 16:
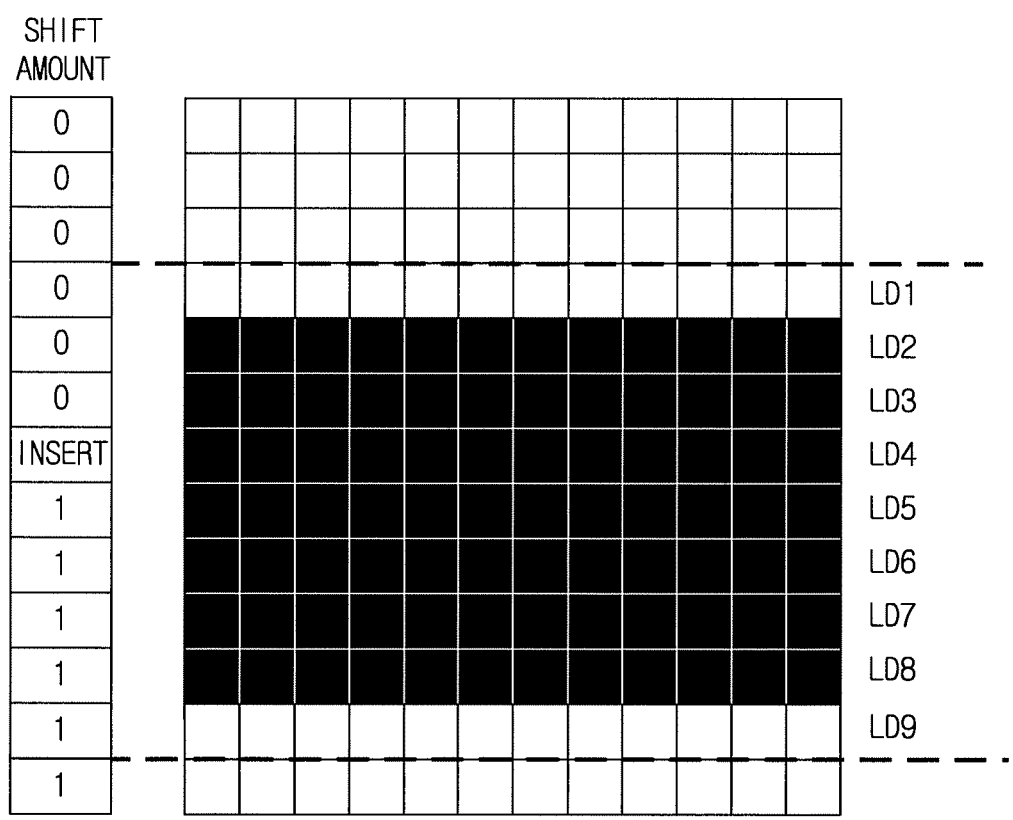
FIG. 16 is a view showing a view showing an image obtained by carrying out the fine variable magnification for the image shown in FIG. 13 and then by inserting one line.

FIG. 16 shows an image obtained by carrying out the fine variable magnification for the image shown in FIG. 13. In this example, one line in the main scanning direction is inserted in the range which is scanned at a time. Specifically, one line is inserted at the position on which the image is drawn by using LD4. The width of the line is increased from 6 dots to 7 dots. In the range which is upper than the insert position of one line, the shift amount is 0. In the range which is lower than the insert position of one line, the shift amount is 1.

Figure 17:
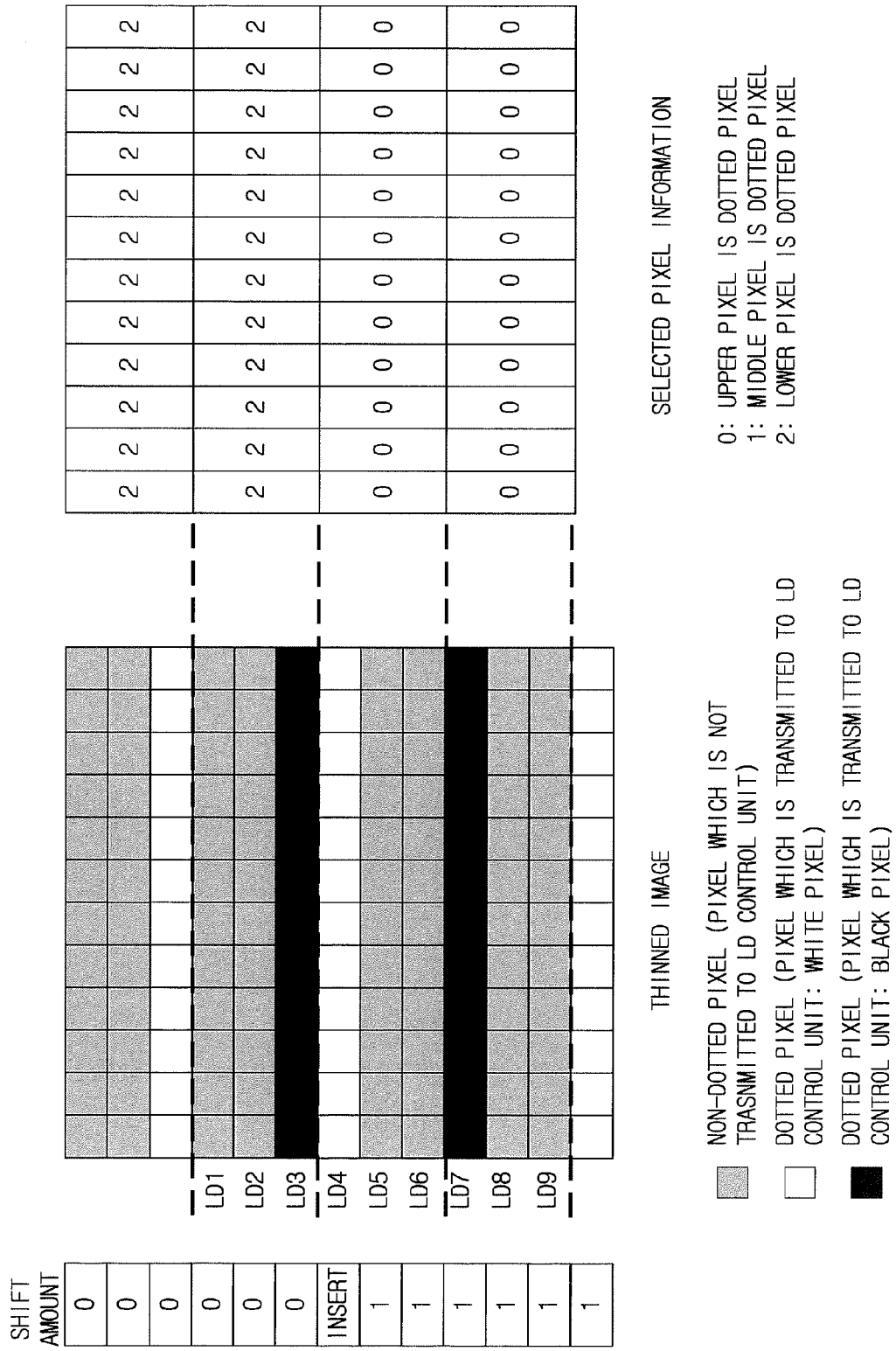
FIG. 17 is a view showing an image obtained by thinning the image shown in FIG. 16, and the position of the dotted pixel and the selected pixel information according to the shift amount.

FIG. 17 shows the thinned image obtained by thinning the image shown in FIG. 16 to ⅓ (3 pixels/9 pixels) in the selection unit 24b, and the selected pixel information which is output for the above image. Like the case of FIG. 15, the selection unit 24b divides 9 pixels into small areas formed by arranging 1 pixel in the main scanning direction and 3 pixels in the sub-scanning direction. In each small area, one pixel is selected as the dotted pixel. The selected pixel information having 2 bit is assigned to each small area.

In the example of FIG. 17, in the small area in which the shift amount is 0, the lower pixel is selected as the dotted pixel. In the small area in which the shift amount is 1, the upper pixel is selected as the dotted pixel. Every when one line is inserted, the shift amount is increased by 1 and the position of the dotted pixel is changed. That is, in case that the shift amount is 0, 3, 6 or the like, the lower pixel is selected as the dotted pixel. In case that the shift amount is 1, 4, 7 or the like, the upper pixel is selected as the dotted pixel. In case that the shift amount is 2, 5, 8 or the like, the middle pixel is selected as the dotted pixel.

As described above, even though nine pixels are thinned to three pixels, it is possible to obtain the effect which is the same as that of the first embodiment. However, because the image data is thinned to ⅓, the density of the dotted pixels is reduced to ⅓ as compared with that of the original image. Therefore, when the diameter of the developed dot is small, there is some possibility that the unevenness of the image is caused and the image quality is deteriorated. However, in case that the difference between the diameter of the dot which is actually developed and the dot diameter determined on the basis of the resolution is sufficiently large, the deterioration of the image quality is small even though the image data is thinned to ⅓. For example, in case that the image having the high resolution is printed, for example, the image having the resolution of 2400 dpi is printed by using the image data having the resolution of 3600 dpi, the above thinning is effective.

Figure 18:
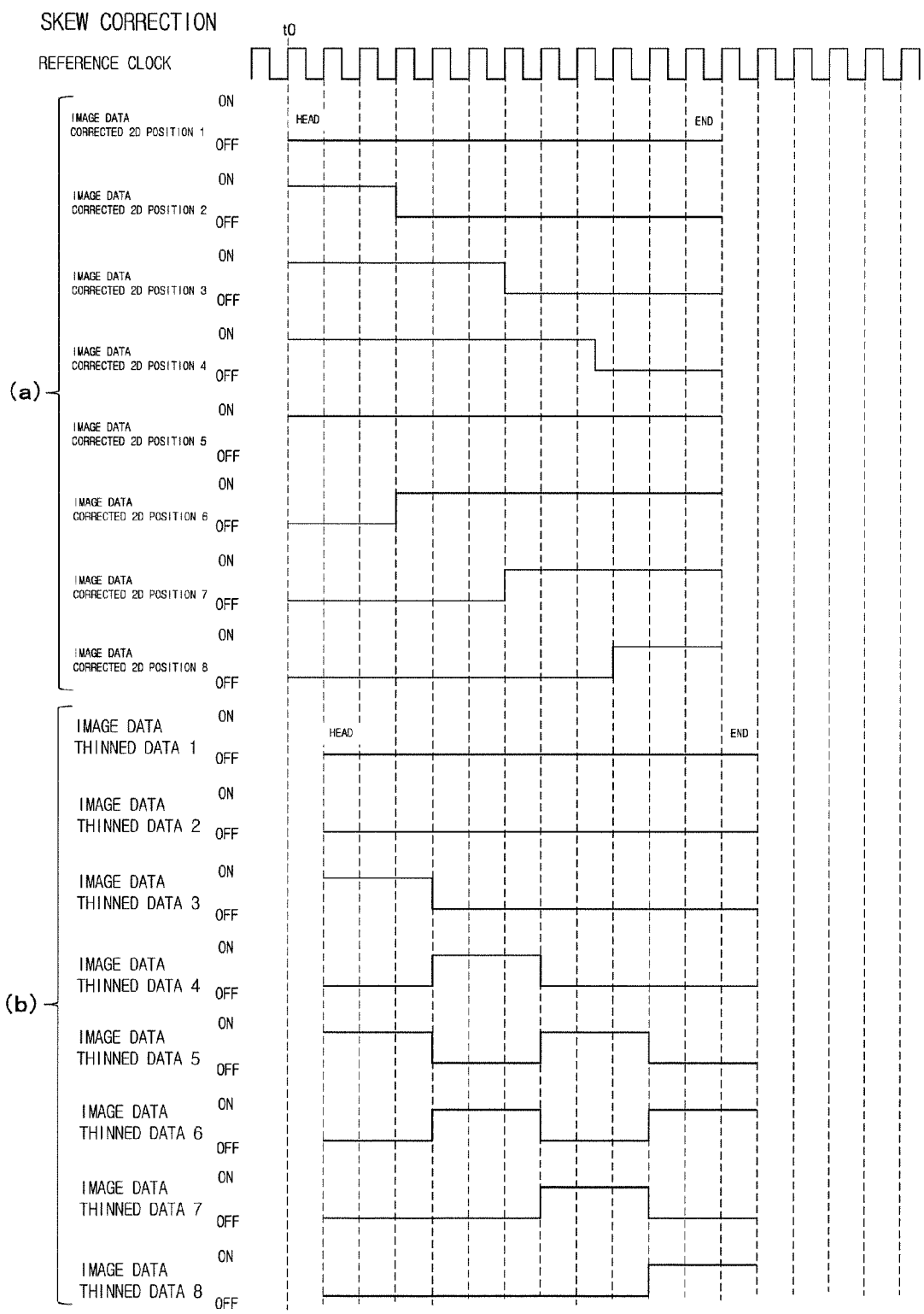
FIGS. 18 and 19 are a view showing the operation timing in case that the skew correction is carried out.
Figure 19:
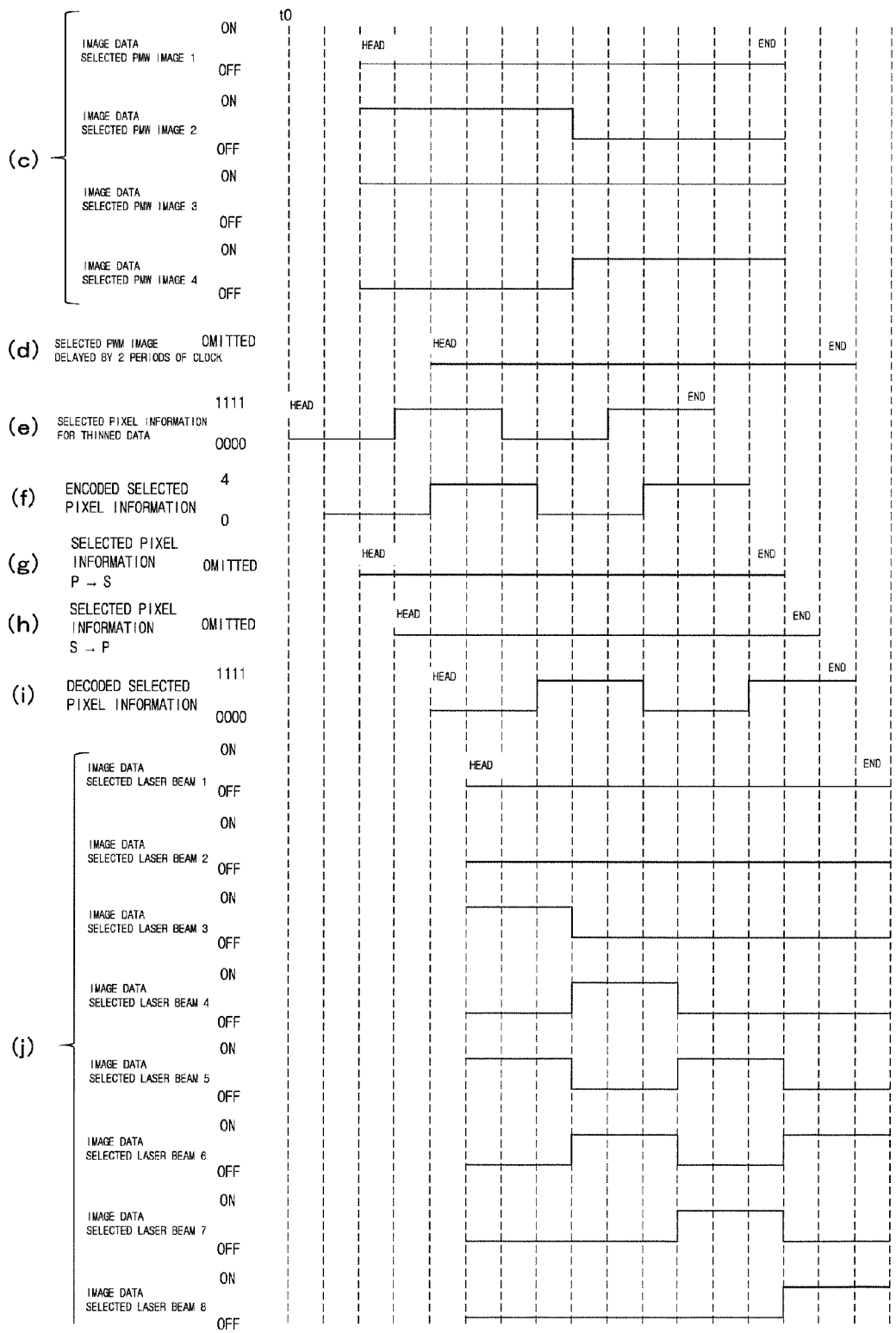

FIGS. 18 and 19 are a view showing the operation timing in case that the skew correction is carried out. In synchronization with the operation for scanning the image in the main scanning direction by using the laser lights emitted from the laser unit 16, the pulse width modulation signals for 8 pixels arranged in the sub-scanning direction, which correspond to the positions in the main scanning direction are sequentially output from the image processing unit 20 to the assignment unit 33 of the LD control unit 30.

The signals shown in the area (a) of FIG. 18 indicate the image data 1 to 8 which are corrected by the image correction unit 22 (in the drawings, referred to as "corrected 2D position"). The signals shown in the area (b) of FIG. 18 indicate the image data 1 to 8 which are thinned by the selection unit 24. The signals shown in the area (b) are delayed by one period of the clock pulse from the signals shown in the area (a). The signals shown in the area (c) of FIG. 19 indicate four selected image data 1 to 4 output from the selection unit 24. The signals shown in the area (c) are delayed by one period of the clock pulse from the signals shown in the area (b).

In the signal shown in the area (d), in order to synchronize with the selected pixel information, the selected image data are delayed by 2 periods of the clock pulse (the detailed explanation is omitted). The signal shown in the area (e) indicates the selected pixel information. In the first to the third pixels in the main scanning direction, because the selected pixel information for four small areas into which eight pixels arranged in the sub-scanning direction are divided indicates all "0" (the upper pixel is selected in each small area), the selected pixel information having 4 bits for the above four small areas indicates "0000". Next, in the fourth to the sixth pixels in the main scanning direction, because the selected pixel information for four small areas into which eight pixels arranged in the sub-scanning direction are divided indicates all "1" (the lower pixel is selected in each small area), the selected pixel information having 4 bits for the above four small areas indicates "1111". Similarly, in the seventh to the ninth pixels in the main scanning direction, the selected pixel information having 4 bits indicates "0000". In the tenth to the twelfth pixels in the main scanning direction, the selected pixel information having 4 bits indicates "1111".

The signal shown in the area (f) is obtained by encoding the selected pixel information shown in the area (e) in accordance with FIG. 8. The information indicating "0000" is encoded to "0", and the information indicating "1111" is encoded to "4". The signal shown in the area (g) is obtained by the parallel/serial conversion. The detail explanation thereof is omitted. The signal is delayed by one period of the clock pulse. The signal shown in the area (h) is obtained by the serial/parallel conversion carried out by the S/P conversion unit 31 of the LD control unit 30. The detail explanation thereof is omitted. The signal is delayed by one period of the clock pulse.

The signal shown in the area (i) is obtained by decoding the selected pixel information in the decompression unit 32. The information indicating "0" is decoded to "0000", and the information indicating "4" is decoded to "1111". The signal is delayed by one period of the clock pulse. In the signals shown in the area (j), four pulse width modulation signals which are transmitted in parallel are assigned to the laser diodes which are indicated in the decoded selected pixel information.

Figure 20:
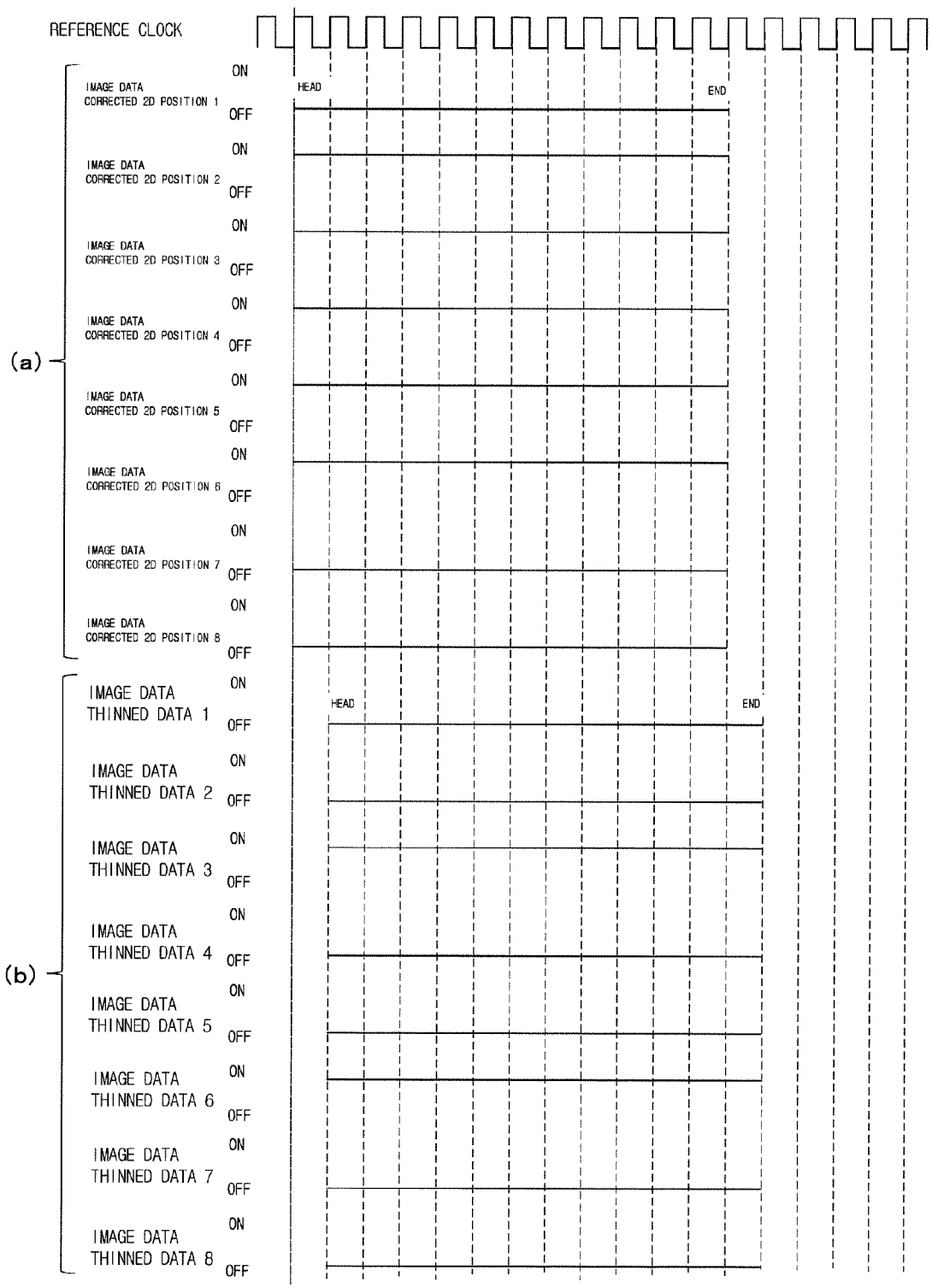
FIGS. 20 and 21 are a view showing the operation timing in case that the line is inserted in the fine variable magnification.
Figure 21:
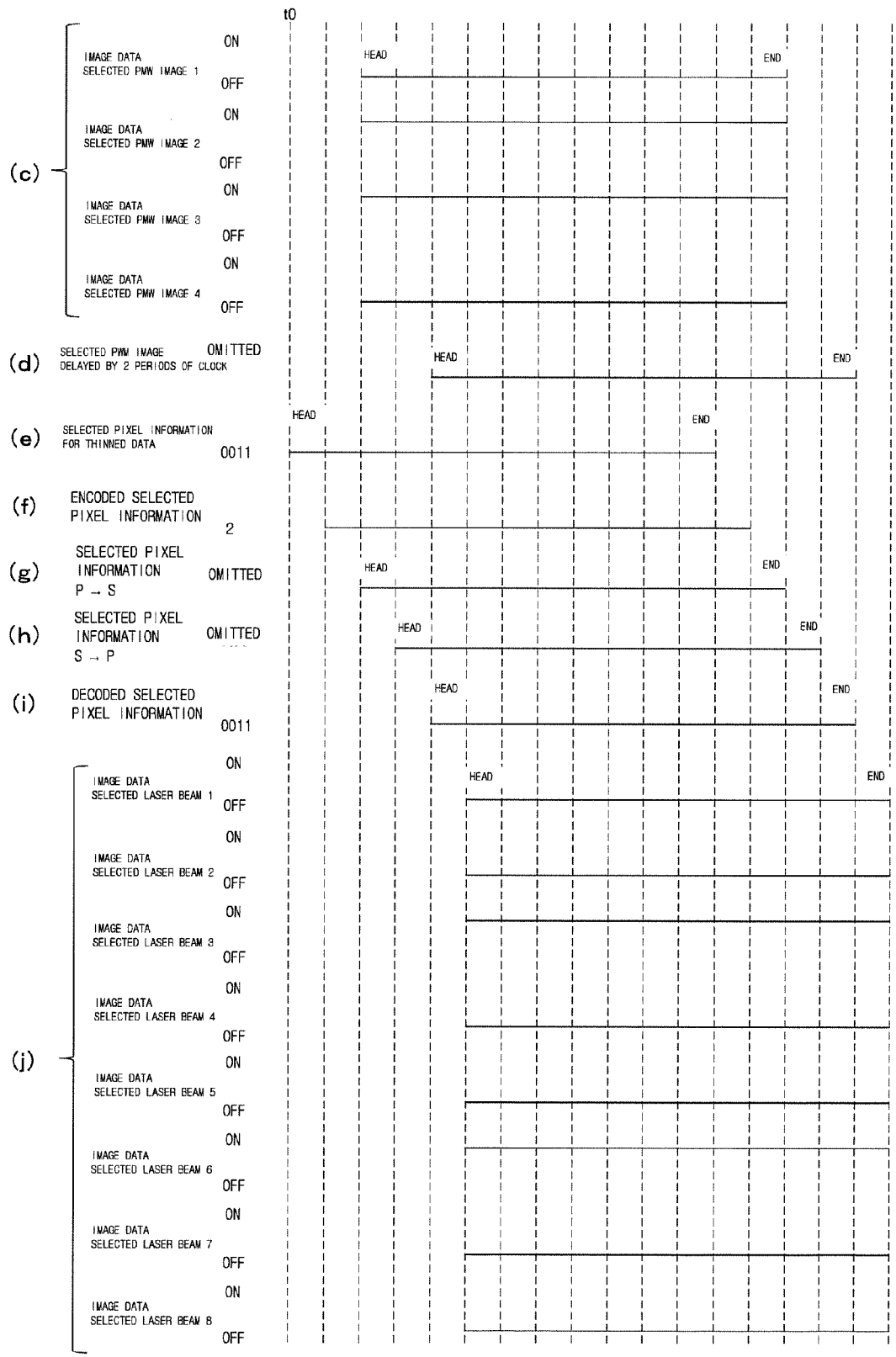
Figure 22:
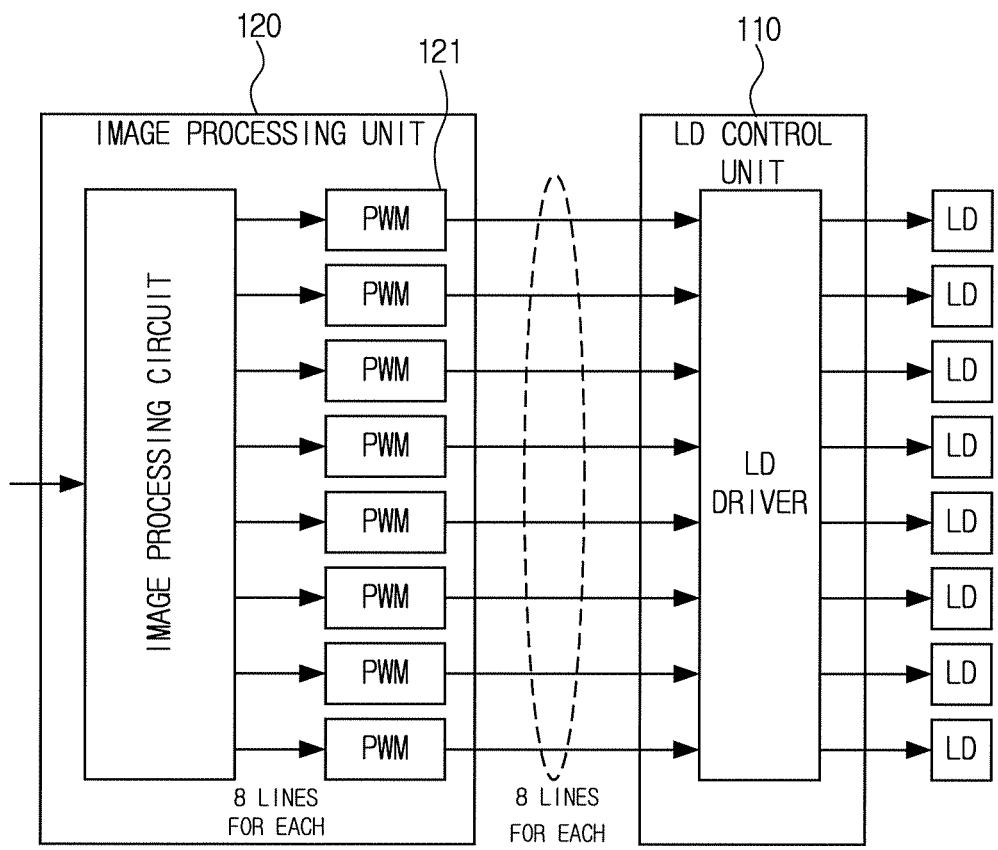
FIG. 22 is a block diagram showing the image processing unit and the LD control unit in a conventional image forming apparatus.

FIGS. 20 and 21 are the operation timing in case of the fine variable magnification. The signals shown in the area (a) of FIG. 20 indicate the image data 1 to 8 which are corrected by the image correction unit 22 (in the drawings, referred to as "corrected 2D position"). The signals shown in the area (b) indicate the image data 1 to 8 which are thinned by the selection unit 24. The signals shown in the area (b) are delayed by one period of the clock pulse from the signals shown in the area (a). The signals shown in the area (c) of FIG. 21 indicate four selected image data 1 to 4 output from the selection unit 24. The signals shown in the area (c) are delayed by one period of the clock pulse from the signals shown in the area (b).

In the signal shown in the area (d), in order to synchronize with the selected pixel information, the selected image data are delayed by 2 periods of the clock pulse (the detailed explanation is omitted). The signal shown in the area (e) indicates the selected pixel information. The selected pixel information having 4 bits indicates "0011".

The signal shown in the area (f) is obtained by encoding the selected pixel information shown in the area (e) in accordance with FIG. 8. The information indicating "0011" is encoded to "2". The signal shown in the area (g) is obtained by the parallel/serial conversion. The detail explanation thereof is omitted. The signal is delayed by one period of the clock pulse. The signal shown in the area (h) is obtained by the serial/parallel conversion carried out by the S/P conversion unit 31 of the LD control unit 30. The detail explanation thereof is omitted. The signal is delayed by one period of the clock pulse.

The signal shown in the area (i) is obtained by decoding the selected pixel information in the decompression unit 32. The information indicating "2" is decoded to "0011". The signal is delayed by one period of the clock pulse. In the signals shown in the area (j), four pulse width modulation signals which are transmitted in parallel are assigned to the laser diodes which are indicated in the decoded selected pixel information.

As described above, the embodiments are explained by using the drawings. However, in the present invention, the concrete configuration is not limited to the above embodiments. In the present invention, various modifications of the above embodiments or the addition of various functions or the like to the embodiments can be carried out without departing from the gist of the invention.

In the image forming apparatus 5 according to each embodiment, it is possible to reduce the number of the PWM processing units 25 and the number of the transmission paths for transmitting the pulse width modulation signals. Further, because the emitting time of each laser diode is shortened by the thinning of the image data, it is possible to lengthen the lifetime of the laser diode.

In the embodiments, the process for selecting the dotted pixels by the selection unit 24 is executed in synchronization with the scanning executed in the laser unit 16. However, the selection of the pixels may be previously executed for the entire image and the result of the above selection may be stored. Then, in accordance with the stored result, each PWM processing unit 25 may generate the pulse width modulation signal and transmit the pulse width modulation signal to the LD control unit 30 in synchronization with the scanning executed in the laser unit 16.

In the embodiments, the pixels to be selected as the dotted pixels are determined according to the shift amount. However, according to another factor, the position of the dotted pixel may be determined. For example, the image is analyzed and the pixel which is arranged in the edge portion in both of the main scanning direction and the sub-scanning direction is always selected as the dotted pixel. Further, for example, in case that there are m or less black pixels (except white pixels) in n pixels which are arranged in the sub-scanning direction and scanned by the laser unit 16 once, all of the black pixels may be selected as the dotted pixels. On the other hand, in case that there are m or more black pixels (except white pixels), m pixels may be selected among the black pixels. Further, the position of the dotted pixel may be selected according to the screen pattern of the image.

In the embodiments, the selected pixel information is compressed and transmitted. However, the selected pixel information may be transmitted without compressing the information.

One of the objects of the above embodiments is to provide an image forming apparatus which can reduce the number of the generation circuits for generating the pulse width modulation signals for controlling the driving of the laser elements and the number of the transmission paths without deteriorating the resolution and the productivity of the image, which can be obtained by simultaneously scanning the image by using a plurality of laser lights.

In at least one of the embodiments, m pixels are selected among n pixels arranged in the sub-scanning direction (the image is thinned to m/n), and the image is formed by driving only the laser elements arranged on the positions corresponding to the above m pixels among n laser elements. At this time, the selected pixel information indicating the positions of the selected m pixels is transmitted to the assignment unit. The assignment unit assigns the m transmitted pulse width modulation signals to m laser elements in accordance with the transmitted selected pixel information.

In at least one of the embodiments, the image is thinned to 1/q. By dividing the pixels into small areas in each of which q pixels are included, the data size of the selected pixel information is reduced.

In at least one of the embodiments, by compressing and transmitting the selected pixel information, the size of the data to be transmitted as the selected pixel information is reduced.

In at least one of the embodiments, m pixels are selected according to the shift amount caused by shifting the pixels in the fine variable magnification or the skew correction.

In at least one of the embodiments, in the fine variable magnification or the skew correction, the selected pixel information is compressed by using the limitation in which the change in the shift amount is caused one time at the maximum in n pixels arranged in the sub-scanning direction.

According to the image forming apparatus, it is possible to reduce the number of the generation circuits for generating the pulse width modulation signals for controlling the driving of a plurality of laser elements and the number of the transmission paths without deteriorating the resolution and the productivity of the image, which can be obtained by simultaneously scanning a plurality of lines by using a plurality of laser lights.

The present U.S. patent application claims the priority of Japanese Patent Application No. 2015-001867, filed on Jan. 7, 2015, according to the Paris Convention, and the entirety of which is incorporated herein by reference for correction of incorrect translation.

What is claimed is:

1. An image forming apparatus for forming a two-dimensional image in which pixels are arranged in a main scanning direction and a sub-scanning direction which is perpendicular to the main scanning direction, comprising:
   n laser elements arranged in the sub-scanning direction and configured to simultaneously scan an image in the main scanning direction by using laser lights emitted from the n laser elements to simultaneously form the image having n lines in the main scanning direction, n being an integer which is 2 or more;
   a pixel selection unit configured to execute a thinning process in which the pixels are thinned to m/n by selecting m pixels among n pixels arranged in the sub-scanning direction, m being an integer which is 1 or more and is less than n, and the thinning process being executed for the image having the n lines, and to output selected pixel information for specifying the selected pixels;
   a pulse width modulation processing unit configured to sequentially convert image data corresponding to the m pixels selected by the pixel selection unit into m pulse width modulation signals for the m pixels in synchronization with the scan of the image when the image having the n lines is formed;
   a transmission unit configured to transmit the m pulse width modulation signals output by the pulse width modulation processing unit in parallel;
   an assignment unit configured to assign the m pulse width modulation signals transmitted by the transmission unit in parallel to m of the laser elements in accordance with the selected pixel information; and
   a driving unit configured to drive the laser elements to which the pulse width modulation signals are assigned by the assignment unit, in accordance with the assigned pulse width modulation signals.

2. The image forming apparatus of claim 1, wherein an equation m×q=n is satisfied, where q is an integer which is 2 or more, and
   the pixel selection unit divides the n pixels arranged in the sub-scanning direction into m small areas in each of which q adjacent pixels are included, selects one pixel from each small area, and outputs information for specifying the pixel selected from each small area as the selected pixel information.

3. The image forming apparatus of claim 1, further comprising:
   a compression unit configured to compress the selected pixel information; and
   a decompression unit configured to decompress compressed data output from the compression unit, to the selected pixel information,
   wherein the assignment unit assigns the m pulse width modulation signals in accordance with the selected pixel information obtained by decompressing the compressed data in the decompression unit.

4. The image forming apparatus of claim 3, further comprising:
   an image correction unit configured to execute a fine variable magnification or a skew correction for the image by shifting the pixels,
   wherein the pixel selection unit selects the m pixels according to a shift amount caused by shifting the pixels in the image correction unit, and
   the compression unit compresses the selected pixel information in a situation in which number of times of change in the shift amount is limited in the n pixels arranged in the sub-scanning direction.

5. The image forming apparatus of claim 1, further comprising:
   an image correction unit configured to execute a fine variable magnification or a skew correction for the image by shifting the pixels,
   wherein the pixel selection unit selects the m pixels according to a shift amount caused in the image correction unit.

* * * * *